United States Patent [19]

Schulte et al.

[11] 3,806,887

[45] Apr. 23, 1974

[54] ACCESS CIRCUIT FOR CENTRAL PROCESSORS OF DIGITAL COMMUNICATION SYSTEM

[75] Inventors: Donald L. Schulte, Elmhurst; Verner K. Rice, Wheaton; Rolfe E. Buhrke, La Grange Park, all of Ill.

[73] Assignee: FTE Automatic Electric Laboratorie Incorporated, Northlake, Ill.

[22] Filed: Jan. 2, 1973

[21] Appl. No.: 320,020

[52] U.S. Cl. .... 340/172.5, 179/18 ES, 235/153 AK

[51] Int. Cl. .... G06f 11/00, G06f 11/04, H04q 3/54

[58] Field of Search ............... 340/172.5, 146.1 BE; 235/153 AC, 153 AK; 179/175.2 C, 175.25, 18 ES; 340/146.1 BE

[56] References Cited

UNITED STATES PATENTS

| | | | |
|---|---|---|---|
| 3,409,877 | 11/1968 | Alterman et al. | 340/172.5 |
| 3,562,716 | 2/1971 | Fontaine et al. | 340/172.5 |
| 3,659,273 | 4/1972 | Knauff et al. | 340/172.5 |
| 3,599,179 | 8/1971 | Arnold | 340/172.5 |
| 3,623,011 | 11/1971 | Baynard et al. | 340/172.5 |
| 3,626,383 | 12/1971 | Oswald | 340/172.5 |
| 3,646,519 | 2/1972 | Wollum | 340/172.5 |
| 3,662,349 | 5/1972 | Bartlett | 340/172.5 |
| 3,692,989 | 9/1972 | Kandiew | 235/153 |

*Primary Examiner*—Paul J. Henon
*Assistant Examiner*—James D. Thomas
*Attorney, Agent, or Firm*—B. E. Franz

[57] ABSTRACT

Maintenance access circuits (MAC) are provided in each of two copies of a programmable Central Processor. The MAC for the active Central Processor is the only one responsive to and capable of executing maintenance instructions. In response to such instructions, the MAC reads information at sense points and controls the state of circuits at control points in both copies of the Central Processor.

Program access to information via MAC is independent of which CP is active—that is, the programs which use MAC instructions merely identify the desired CP as active or passive, and the system will respond whether CPϕ or CP1 is active.

The MAC circuits of each CP communicate with each other by means of an external AC bus system including a select or address bus, a data bus and a return bus. Each MAC has internal maintenance buses corresponding to and in communication with these external buses for transmitting information to control points and for retrieving information from the sense points which are addressed. Addressing is accomplished by an X and Y coincident select codes wherein one of the selection codes, namely the Y-select code is selectively gated to the external MAC Select Bus in such a manner that any one of the following combinations of Central Processor may be addressed: only the active CP, only the standby CP, or both active and standby CP's.

8 Claims, 21 Drawing Figures

CENTRAL PROCESSOR FUNCTIONAL INTERFACE BLOCK DIAGRAM

PROCESSOR CONTROL CIRCUIT (PCC)

CONFIGURATION CONTROL CIRCUIT

MAINTENANCE ACCESS CIRCUIT

COINCIDENT PULSE SELECTION

| Y SELECT: Y 24 25 26 27 | Y SELECT: MASE ACT | Y SELECT: MASE SBY | IMSB | X SELECT: X=1000 IMSB B28 | X SELECT: X=0100 IMSB B29 | X SELECT: X=0010 IMSB B30 | X SELECT: X=0001 IMSB B31 |
|---|---|---|---|---|---|---|---|
| 0 0 0 1 | .B27 | .B23 | .B27 | MCG-3 & MSG-3 | MCG-2 & MSG-2 | MCG-1 & MSG-1 | MCG-0 & MSG-0 |
| 0 0 1 0 | .B26 | .B22 | .B26 | MCG-7 & MSG-7 | MCG-6 & MSG-6 | MCG-5 & MSG-5 | MCG-4 & MSG-4 |
| 0 1 0 0 | .B25 | .B21 | .B25 | MCG-11 & MSG-11 | MCG-10 & MSG-10 | MCG-9 & MSG-9 | MCG-8 & MSG-8 |
| 1 0 0 0 | .B24 | .B20 | .B24 | MCG-15 & MSG-15 | MCG-14 & MSG-14 | MCG-13 & MSG-13 | MCG-12 & MSG-12 |

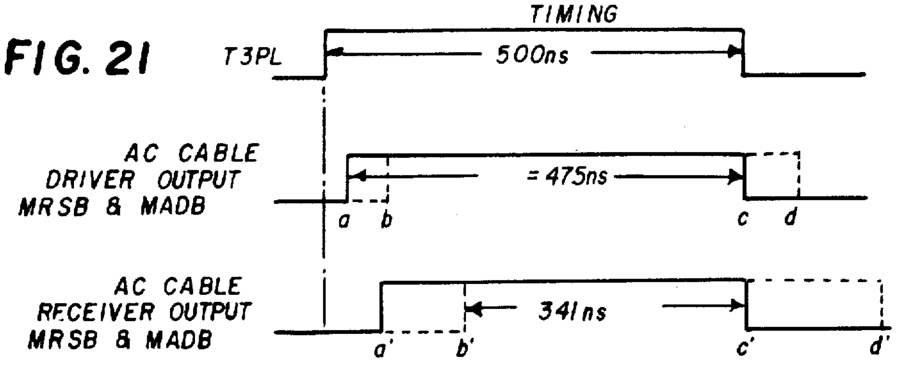

FIG. 21

SOLID LINES SHOW PULSE WITH MINIMUM DELAY AND MAXIMUM SHRINKAGE.
DOTTED LINES SHOW PULSE WITH MAXIMUM DELAY.

TIME FROM START OF T3PL TO:

a = MINMUM DRIVER DELAY ($D_{min}$) = 25 ns
b = MAXIMUM DRIVER DELAY ($D_{max}$) = 75 ns c = a + 500ns - MAXIMUM PULSE SHRINKAGE(S) = 25 + 500-25ns = 500 ns d = b + 500 ns = 575 ns a' = a + MIN. CABLE DELAY + MIN. RECEIVER DELAY = 25 + 16 + 25 = 66 ns b' = b + MAX. CABLE DELAY + MAX. RECEIVER DELAY = 75 + 20 + 75 = 170ns C' = a' + c - PULSE SHRINKAGE (CABLE) - PULSE SHRINKAGE (RECEIVER)
= 66 + 475 - 1.2 % 475 - 5 % (1.2 % 475) = 66 + 475 - 5.7 - 23.5 510ns d' = b' + 500ns = 670 ns

ACCESS CIRCUIT FOR CENTRAL PROCESSORS OF DIGITAL COMMUNICATION SYSTEM

BACKGROUND AND SUMMARY

The present invention relates to electronic circuitry for gathering information from preselected sense locations or "points" and for controlling individual circuits at control points in a large digital communication system. The present invention is particularly useful in performing maintenance of the circuitry of digital communication systems which have provided duplicate copies of a central data processor for reliability.

The invention will be described in connection with a larger system disclosed in copending, co-owned application of Brenski, et al., entitled "Control Complex for TSPS Telephone System," Ser. No. 289,718, filed Sept. 15, 1972. Although the central processor disclosed in this application is a simplex central processor, the present application will disclose such additional elements as are necessary to more fully understand the invention.

An object of the invention is to provide for maintenance access to sense and control points in both the active and the standby processor, with maintenance programs being run on the active processor.

In brief, the Maintenance Access Circuit (MAC) provides a program controlled communication channel for access to sense points and for control of individual circuits (particularly flip-flops) which are located throughout the central processor complex. The MAC enables a maintenance program to control the system configuration (i.e., set up the various bus configurations connecting elements of this system), control malfunction detection circuitry, and obtain information for fault recovery, diagnosis, and routine checking.

The principal features of the present invention are:

a. The active Central Processor is able to access Maintenance Control Points (MCP) and Maintenance Sense Points (MSP) in both copies of the Central Processor. These individual points are formed into groups, and the active Central Processor is able to read and control Maintenance Sense Groups (MSG) and Maintenance Control Groups (MCG) in the standby CP as long as the standby unit has power on.

b. All inter-connections between the Central Processors are designed such that a failure in one will not affect the operation of the other.

c. All failures in either Central Processor are diagnosable such that no ambiguity exists between which Central Processor contains the fault.

d. No single failure of the MAC will disable system operation.

e. Program access to information via MAC is independent of which CP is active—that is, the programs which use MAC instructions merely identify the desired CP as active or passive, and the system will respond whether CP$\phi$ or CP1 is active.

Other features and advantages of the present invention will be apparent to persons skilled in the art from the following detailed description of a preferred embodiment accompanied by the attached drawing wherein identical reference numerals will refer to like parts in the various views.

The MAC circuits of each CP communicate with each other by means of an external AC bus system including a select or address bus, a data bus and a return bus. Each MAC has internal maintenance buses corresponding to and in communication with these external buses for transmitting information to control points and for retrieving information from the sense points which are addressed. Addressing is accomplished by an X and Y coincident select codes wherein one of the selection codes, namely the Y-select code is selectively gated to the external MAC Select Bus in such a manner that any one of the following combinations of Central Processor may be addressed: only the active CP, only the standby CP, or both active and standby CPs.

THE DRAWING

FIG. 21 is a diagrammatic showing of the pulse timing for reading and writing with MAC.

OUTLINE

Figure 1:
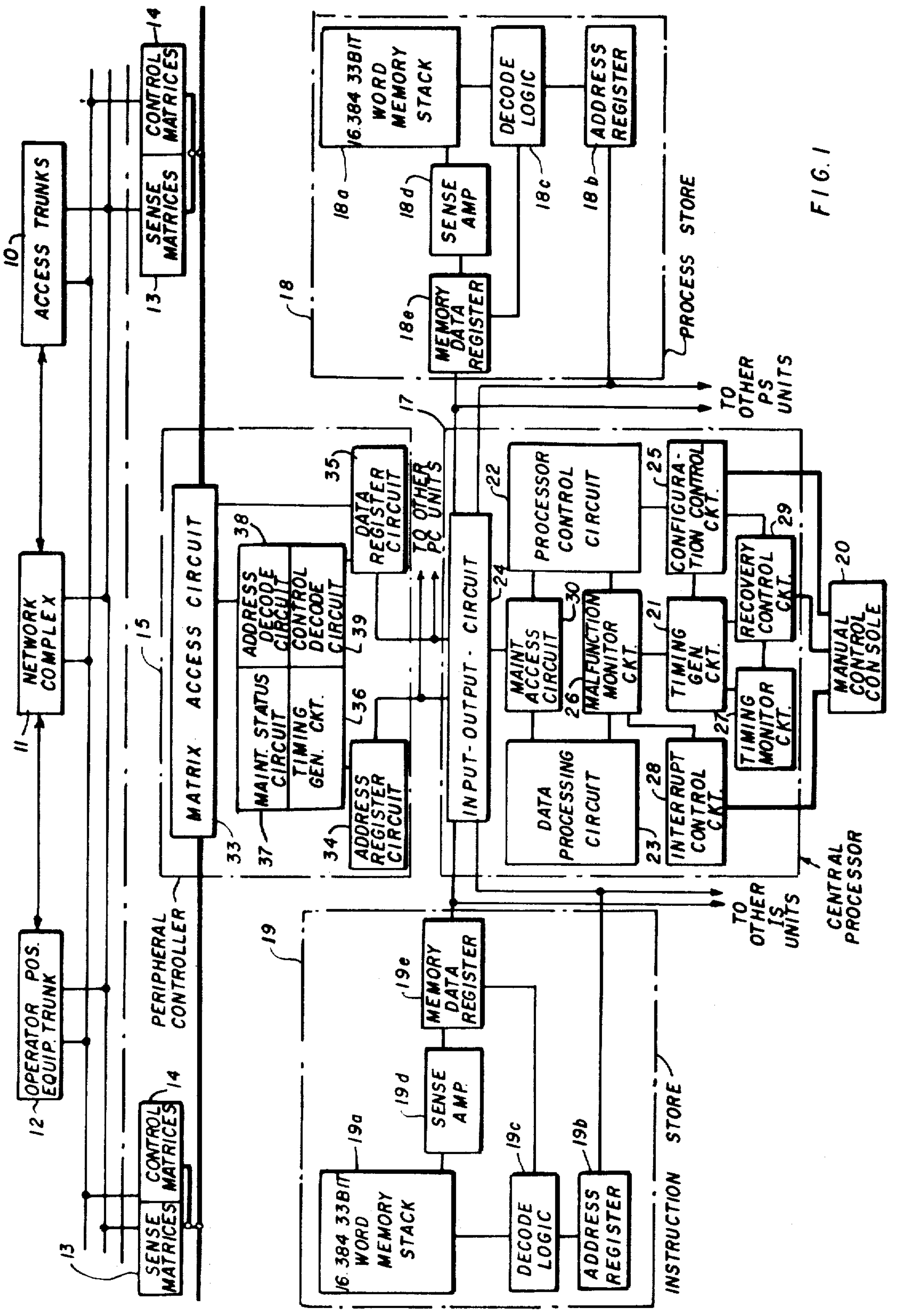
FIG. 1 is a functional block diagram of a TSPS System, including a Control and Maintenance Complex.

I. Introduction — TSPS 8
II. The Central Processor — An Overview 16
A. Processing Circuits of Central Processor 21
Timing Generator Circuit (TGC) 21
Processor Control Circuit (PCC) 23
Input Output Circuit (IOC) 26
B. Maintenance Circuits 27
Malfunction Monitor Circuit (MMC) 29
Timing Monitor Circuit (TMC) 31
Interrupt Control Circuit (ICC) 33
Recovery Control Circuit (RCC) 35
Configuration Control Circuit (CCC) 36
Maintenance Access Circuit (MAC) 38
Power Monitor Circuit (PMC) 39
III Maintenance Access Circuit 40
Sense and Control Points 42
Write Maintenance Control Point (WMCP) 46
Read Maintenance Sense Group (RMSG) 46
Note on Addressing 47
Addressing and Gating Control 48
Inputs 56
Prime Inputs 56
Bus Inputs 57
Outputs 58

DETAILED DESCRIPTION

I. Introduction—TSPS

The primary function of the TSPS (toll service position system) System is to provide data processor control of the various functions in toll calls which in the past have been performed by operators but have not required the exercise of discretion on the part of the operator. At the same time, the system must permit operator intervention, as required. Thus, various trunks from an end office to a toll center pass through the TSPS System, and these are commonly referred to as ACCESS Trunks, functionally illustrated in FIG. 1 by the block 10.

The access trunks 10 are connected to and pass through access trunk circuits in a network complex 11 which is physically located at the same location as the TSPS base unit, and the network complex 11 permits the system to access each individual trunk line to open it or control it, or to signal in either direction. There is no switching or re-routing of trunks or calls at this location. Each trunk originating at a particular end office is permanently wired to a single termination in a remote toll office while passing through a TSPS network complex or trunk circuit en route.

The various access trunks may originate at different end offices, but regardless of origin, they are served in common by the TSPS System and the operators and traffic office facilities associated with that system. Hence, the equipment interfaces with various auxiliary equipment incidental to gaining access to the throughput access trunks, including remote operator positions, equipment trunks, magnetic tape equipment for recording charges, and various other equipment diagrammatically illustrated by the block 12. Additional details regarding the network complex 11 and the auxiliary equipment and communication lines 12 for a TSPS System may be obtained from the *Bell System Technical Journal* of December, 1970, Vol. 49, No. 10.

The present invention is more particularly directed to one aspect of the data processor which controls the telephony—namely the maintenance circuitry in the Central Processor (CP) which controls the systems and performs call processing as well as maintenance and recovery functions. The central Processor is shown in simplex form within the chain block 17 of FIG. 1.

It will be observed that the telephony equipment is about three orders of magnitude in time slower, on the average, than is necessary to execute individual instructions in modern high-speed digital computers. For example, for the present system a clock increment for the Central Processor is 4 microseconds whereas the trunk circuits are sampled every 10 milliseconds. Hence many functions can be performed in the Central Processor, including internal and external maintenance, table look-ups, computations, monitoring of different access trunks, system recovery from a detected fault, etc. between the expected changes in a given trunk.

The TSPS System uses a stored program control as a means of attaining flexibility for varied operating conditions. Reliability is attained by duplicating hardware wherever possible. A stored program control system consists of memories for instructions and data and a processing unit which performs operations, dictated by the stored instructions, to monitor and control peripheral equipment.

A Control and Maintenance Complex (CMC) contains the Instruction Store Complex (IS*), Process Store Complex (PS*), Peripheral Unit Complex (PC*), and the Central Processor Complex (CP*). The asterisk designates all of the circuitry associated with a complex, including the duplicate copy, if applicable.

The interface between the telephony equipment and the data processor is the Peripheral Unit Complex which includes a number of sense matrices 13 and control matrices 14 together with a Peripheral Controller diagrammatically indicated by the chain block 15.

The principal elements of the data processing circuitry include the Central Processor (CP) 17, a Process Store (PS) enclosed within the chain block 18, and an Instruction Store (IS) enclosed within the chain block 19. A computer operator or maintenance man may gain manual access into the Central Processor 17 by means of a manual control console 20, if desired or necessary.

The Instruction Store (IS) 19 which consists of two copies, contains the stored programs. Each copy has up to eight units as shown in block 19 and includes two types of memory:

1. A read-only unit **19*a*** containing a maximum of 16,384 33 bit words.
2. Core Memory in remaining units containing a maximum of seven units of 16,384 33 bit words per unit. Individual words are read from or written into IS by CP 17, as will be more fully described below.

Each IS unit 19 of the eight possible is similar; and they are of conventional design including an Address Register **19*b* receiving digital signals representative of a particular word desired to be accessed (for reading or writing as the case may be). This data is decoded in the Decode Logic Circuit 19*c*; and the recovered data is sensed by sense amplifiers 19*d* and buffered in a Memory Data Register 19*e* which also communicates with the Central Processor 17**.

The Process Store (PS) 18 contains call processing data generated by the program. The PS (also in duplicate copies) comprises Core Memory units **18*a* containing a maximum of eight units of 16,384 33 bit words for each copy. Individual words are read from or written into PS by CP in a manner similar to the accessing of the Instruction Store 19, just described. That is, an Address Register 18*b* receives the signals representative of a particular location desired to be accessed; and this information is decoded in a conventional Decode Logic Circuit 18*c*. The recovered information is sensed by sense amplifiers 18*d* and buffered in Memory Data Register 18*e***.

The CMC communicates with the telephony and switching equipment through matrices 13, 14 of sense and control devices. Any number of known design elements will work insofar as the instant invention is concerned. The sense and control matrices 13, 14 are each organized into 32 bit sense words and 32 bit control words. On command of CP, PC samples a sense word and returns the values of the 32 sense points to CP. Each control point is a bistable switch or device. To control telephone and input/output equipment, CP sets a word of control points through PC. PC together with the sense and control matrices comprise the Peripheral Unit Complex (PU).

CP sequentially reads and executes instructions which comprise the program, from IS. The CP reads and executes most instructions of 4 microseconds (one machine cycle time). Those instructions that access IS require 8 microseconds require two machine cycles to be executed and are referred to as "dual cycle" instructions.

The instructions obtained from the IS can be considered "Directives" to the CP specifying that it is to perform one of the following operations:

a. Change and/or transfer information inside the CP in accordance with some fixed rule.
b. Communicate with the IS or PS by requesting the IS/PS to either;
   1. Read a 33 bit word from a specified location, or
   2. Write a 33 bit word into a specified location.
c. Communicate with the PC by requesting PC to either;
   1. Read a specified 32 bit from sense point word, or
   2. Write into a specified 32 bit control point word.
d. Perform maintenance operations internal to CP by either;
   1. Reading from a maintenance sense group, or
   2. Writing into a maintenance control group.

The Control and Maintenance Complex may be viewed from two levels: a processing level and a maintenance level. At the processing level (which includes the control and maintenance of the telephone equipment) the CMC appears to be an unduplicated, single processor system as in FIG. 1. At the maintenance level (which here refers only to CMC maintenance) the CMC consists of duplicated copies of the units in each complex, as seen in FIG. 2.

The duplication within the CMC is provided for three purposes:

1. In the event that a failed unit is placed out-of-service, its copy provides continued operation of the CMC.
2. Matching between copies provides the primary means of detecting failures.
3. In-service units can be used to diagnose an out-of-service unit and report the diagnostic results.

Each complex within the CMC may be reconfigured (with respect to in-service and out-of-service units) independently of the other complexes to provide higher overall CMC reliability.

The CMC operation is monitored by internal checking hardware. In the event of a malfunction (misbehavior) due either to noise or to failure), the CP is forced into the execution of a recovery program by a maintenance interrupt.

When the malfunction is due to failure, the recovery program will find the failed copy and place it out-of-service. When at least one complete set of units in each complex can be placed in-service, the fault recovery program will terminate after reconfiguring the CMC to an operational system. If a good set of units in each complex cannot be found, the fault recovery program continues until manual intervention occurs.

To facilitate the recovery operation, a hierarchy of in-service copies are defined:

1. One Central Processor must always be in the active state, only the active CP can change the configuration of the CMC,
2. If the other CP is in-service, that CP is the standby CP, and
3. The in-service copies of Instruction Store, Process Store, and Peripheral Control Units are designated as primary and secondary where the primary copies are associated with the active CP.

Each Peripheral Control Unit may also be designated as active or standby; only the active Peripheral Control Unit controls telephone equipment through the sense and control points. Further, the duplicate copies of IS are designated active and standby according to which one (called the "active" one) is associated with the primary CP.

II. The Central Processor—An Overview

The CP circuits provide two specific functions: processing and maintenance. The processing circuits provide a general purpose computer without the ability to recover from hardware failures. The maintenance circuits together with the processing circuits provide the CMC with recovery capability.

The Central Processor is divided into 10 circuits. The first four provide the processing function.

1. Timing Generator Circuit (TCG), designated 21,
2. Processor Control Circuit (PCC), 22,
3. Data Processing Circuit (DPC), 23, and
4. Input/Output Circuit (IOC), 24.

The above four processing circuits are described herein only to the extent necessary to understand the present invention. Additional details may be found in the copending, co-owned application of Brenski, et al., entitled "Control Complex for TSPS Telephone System," filed Sept. 15, 1972, and assigned Ser. No. 289,718. The subject matter of this application is incorporated herein by reference.

The remaining circuits in the CP provide the maintenance function and these include:

5. Configuration Control Circuit (CCC) 25,
6. Malfunction Monitor Circuit (MMC) 26,
7. Timing Monitor Circuit (TMC) 27,

8. Interrupt Control Circuit (ICC) 28,
9. Recovery Control Circuit (RCC) 29, and In FIG. 2, there is shown duplicate copies of each of the above circuits in the Central Processor, with like circuits having identical reference numerals.

Turning back to FIG. 1, a pair of Peripheral Controllers is associated with each Peripheral Control Unit (PCU). Each Peripheral Controller 15 includes the following circuits which are also described in more detail in the above-referenced Brenski et al. application Ser. No. 289,718:

1. A Matrix Access Circuit 33,
2. An Address Register Circuit 34,
3. A Data Register Circuit 35,
4. A Timing Generator Circuit 36,
5. A Maintenance Status Circuit 37,
6. An Address Decode Circuit 38, and
7. A Control Decode Circuit 39.

Figure 2:
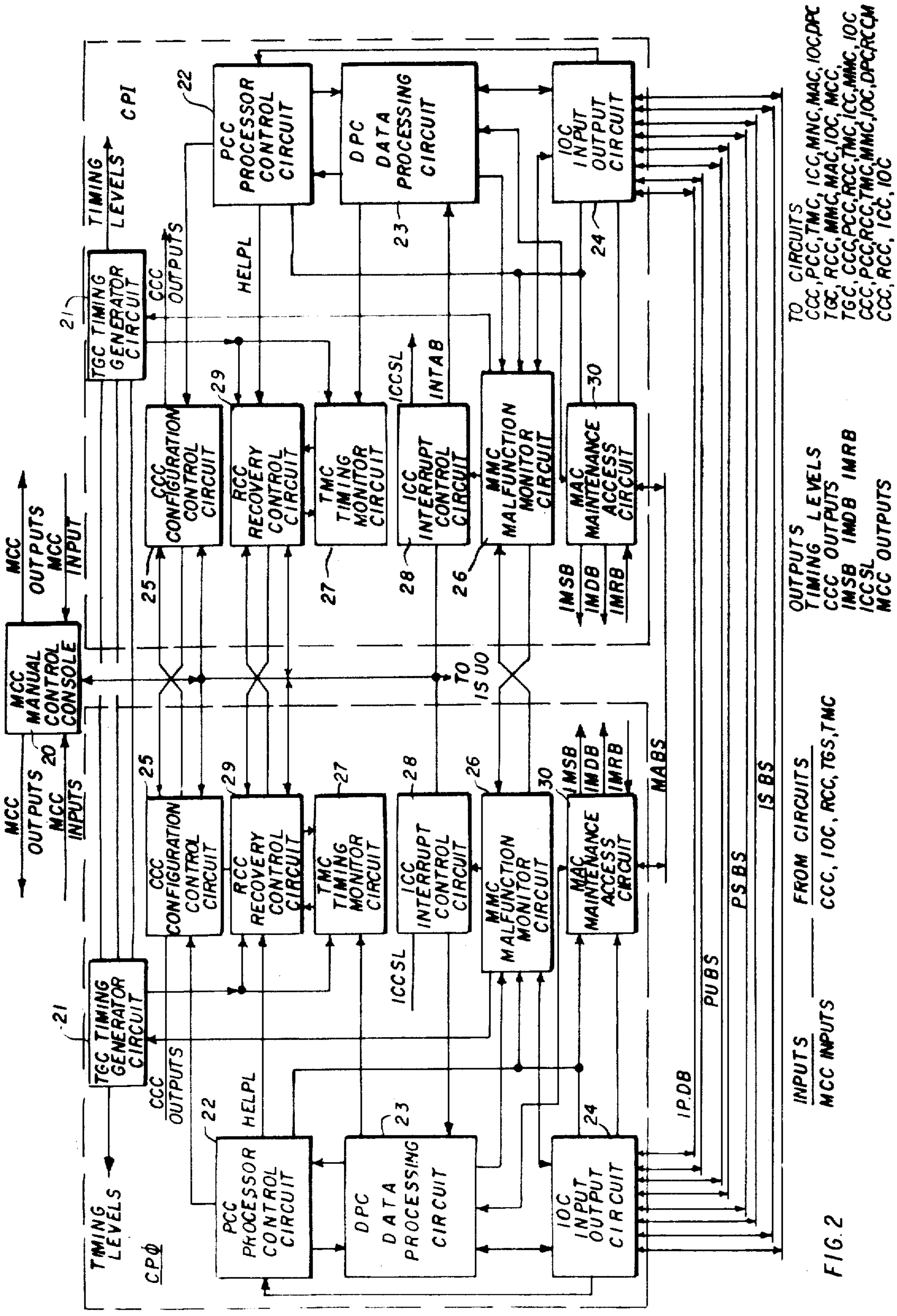
FIG. 2 is a functional block diagram showing redundant copies of the Central Processor and their associated busing systems.
Figure 2A:
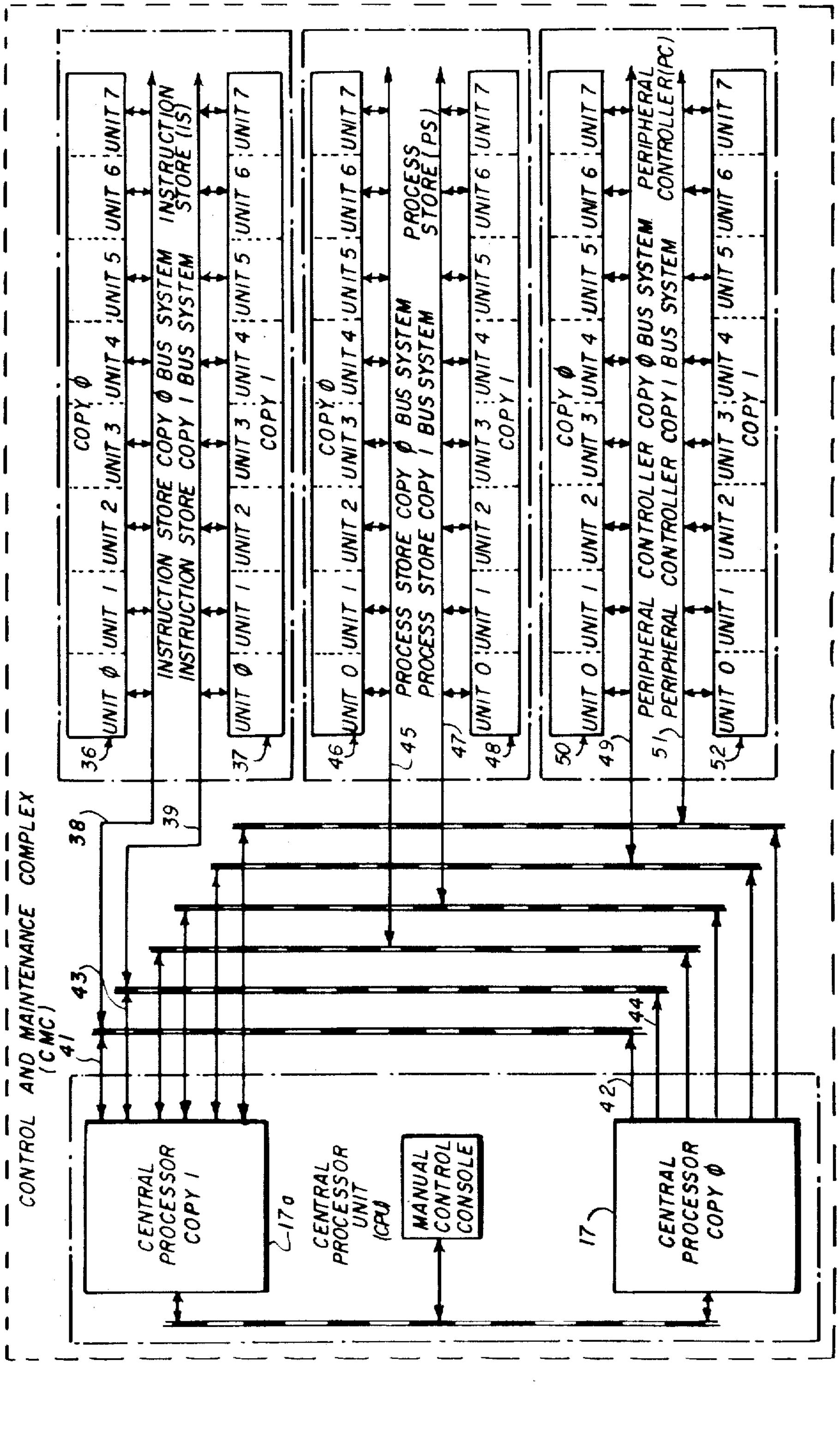
FIG. 2A is a functional block diagram showing communication between both copies of the Central Processor and duplicate copies of the Instruction Store, Process Store, and Peripheral Controller.

The functional interface between the Central Processor, and other system equipment, is shown in functional block diagram form in FIG. 2A. As can be seen, there is intercommunication between both copies of the Central Processor designated 17 and 17a respectively and the manual control console. Maintenance personnel can monitor the status and manually reconfigure the control and maintenance complex from this console.

As can also be seen in FIG. 2A, both Central Processor copies have direct, two-way communication links between each other, via internal bus 35, and with both copies of Instruction Store, designated 36 and 37 respectively, via their associated bus systems 38 and 39. Similar communication is provided with the Process Store, and the Peripheral Controllers. This interface is provided by six separate bus systems.

I. An Instruction Store copy ϕ bus system (ISϕ. BS) is designated 38. This interfaces both copies **17*a*, 17 of the Central Processor via buses 41, 42 with each of the eight units (ISϕ.Uϕ through ISϕ.U7) that form Instruction Store copy ϕ (ISϕ) generally designated 36**.

II An Instruction Store copy 1 bus system (ISI.BS) is designated 39. This interfaces both copies of the Central Processor via buses 43, 44 with each of the eight units (IS1.Uϕ) through IS1.U7) that form Instruction Store copy 1 (ISI), generally designated 37.

III. A process Store copy ϕ bus system (PSϕ.BS) is designated 45; and it interfaces both copies of the Central Processor with each of the 8 units PSϕ.Uϕ through PSϕ.U7) that make up Process Store copy ϕ (PSϕ), generally designated 46.

IV. A Process Store copy 1 bus system (PS1.BS) is designated 47; and it interfaces both copies of the Central Processor with each of the 8 units (PS1.Uϕ through PS1.U7) that make up Process Store copy 1 (PS1), generally designated 48.

V. A Peripheral Controller copy ϕ bus system (PCϕ.BS) is designated 49; and it interfaces both copies of the Central Processor with each of the eight Peripheral Controllers (PCϕ.Uϕ through PCϕ.U7) in Peripheral Control copy ϕ (PCϕ), generally designated 50.

VI. A Peripheral Controller copy 1 bus system (PC1.BS) is designated 51; and it interfaces both copies of the Central Processor with each of the eight Peripheral Controllers (PC1.Uϕ through PC1.U7) in Peripheral Control copy 1 (PC1), generally designated 52.

Each copy of the Peripheral Control bus system contains an address bus (PCϕ.AB and PC1.AB), a return bus (PCϕ.RB and PC1.RB), and a data bus (PCϕ.DB and PC1.DB). Each copy of the process store bus system contains an address bus (PSϕ.AB and PS1.AB) and a return bus (PSϕ.RB and PS1.RB). Each copy of the Instruction Store bus system contains an address bus (ISϕ.AB and IS1.AB, and a return bus (ISϕ.RB and IS1.RB). Each copy ϕ of the Instruction Store bus system and the Process Store bus system share the same data bus: Instruction Store and Process Store copy ϕ data bus (IPϕ.DB). Each copy 1 of the Instruction Store bus system and the Process Store bus system also share the same data bus: Instruction Store and Process Store copy 1 data bus (IPI.DB).

This data bus sharing by Instruction Store and Process Store affects the sequence of instructions that are to be executed by the Central Processor. An instruction directing the Central Processor to access (read from or write into) Process Store requires only one machine cycle, while an 9 instruction directing the Central Processor to access Instruction Store requires two machine cycles. This means that the Central Processor can execute Process Store instructions in sequence, one after the other, for as long as needed, and it can also execute an Instruction Store instruction immediately following a Process Store instruction. However, it cannot execute two Instruction Store instructions, in sequence, nor can it execute a Process Store instruction immediately after an Instruction Store instruction, because of the shared data bus. The Central Processor will have been in the execution of an Instruction Store instruction only one machine cycle of the two required, when it starts executing the next instruction in sequence, and these two instructions can not use the same data bus (IPO.DB or IPI.DB) simultaneously.

It is believed that a better understanding of the present invention will be obtained if there is an understanding of the overall function of each circuit in the CP, realizing that there are duplicate copies of the CP.

II. A. Processing Circuits of Central Processor

Timing Generator Circuit (TGC)

Figure 3:
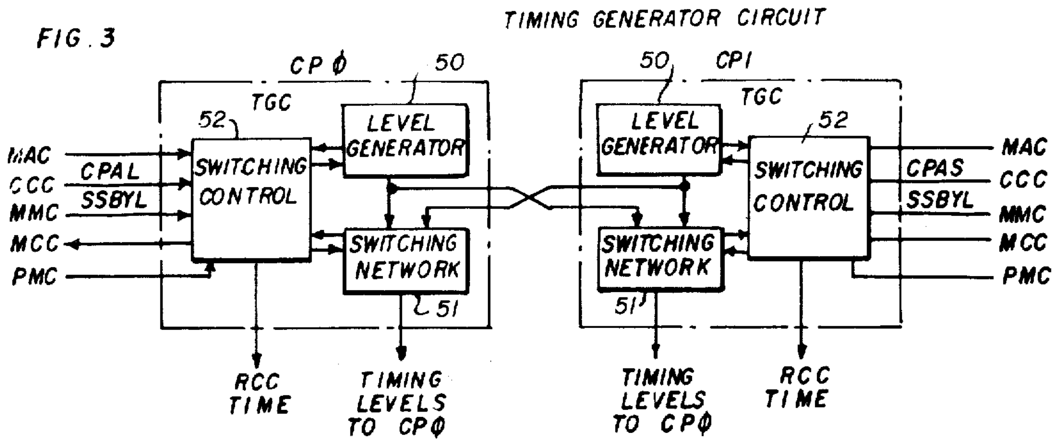
FIG. 3 is a functional block diagram of the Timing Generator Circuit of the Central Processor.

The Timing Generator Circuit 21 of FIGS. 1 and 2 (TGC) creates the timing intervals for the Central Processor. A more detailed functional block diagram for the TGCs of both Central Processors is shown in FIG. 3.

The TGC includes a level generator circuit 50 and creates eight timing intervals (or "levels" as they are referred to) every 4 μseconds. Each pulse is picked off a delay line. For each timing interval, TGC produces a 500 nano second (ns) timing interval place level (PL) and a 400 ns. timing interval accept level (AL). Each sequence of eight timing intervals is called a cycle. Nearly all sequential control in the CP is provided by the timing interval place and accept levels.

Generally, the timing interval place levels are used to gate information out of flip-flop storage while timing interval accept levels are used to accept information into flip-flop storage.

The TGC in each CP generate timing levels. To assure synchronism between CP's Timing levels generated in the active CP control both CP's. A switching network 51 actuated by a switching control circuit 52 in each TGC transmits (if it is in the active CP) or receives the timing levels from the active TGC, and supplies them to the CP circuits. The standby CP may be stopped by directing the TGS in the standby CP to inhibit reception of timing levels. The TGS also notifies the REcovery Control Circuit 29 (RCC) and Timing Monitor Circuit 27 (TMC) for maintenance purposes whenever the CP's active/standby status changes.

Processor Control Circuit (PCC)

Figure 4:
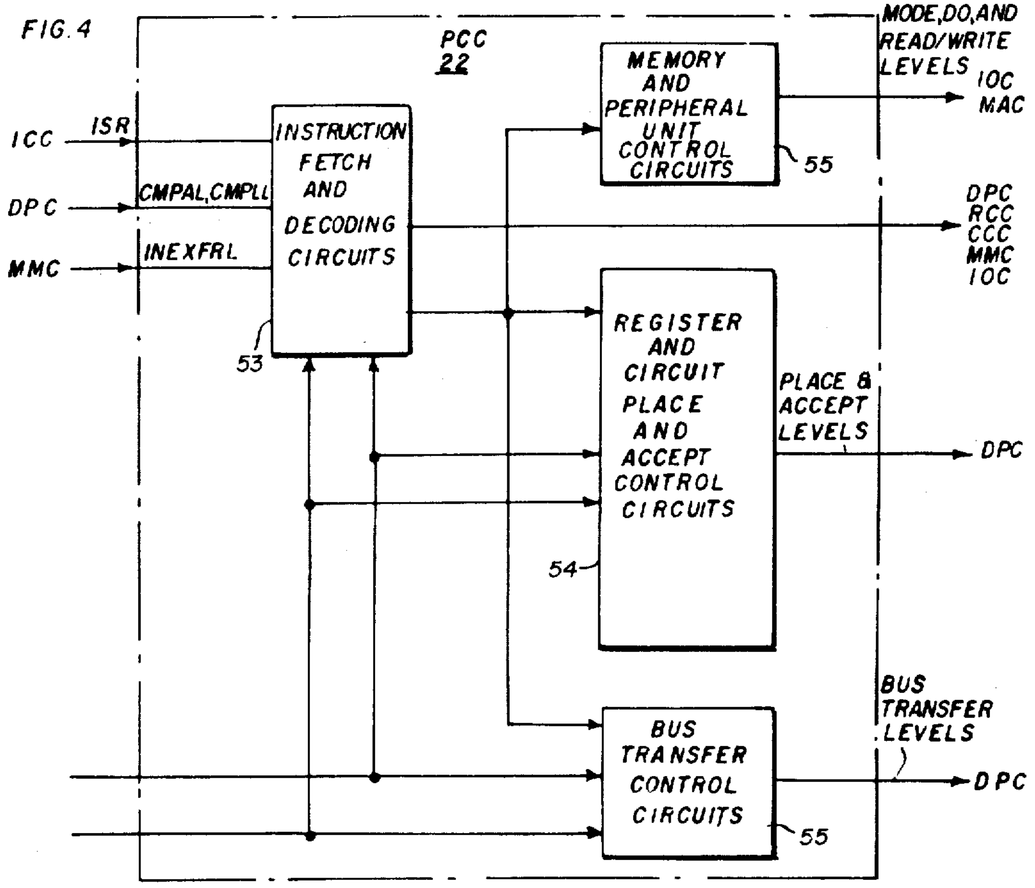
FIG. 4 is a functional block diagram of the Processor Control Circuit of the Central Processor.

The PCC 22 (see FIG. 4 for a more detailed functional block diagram) includes instruction fetch and decode circuits 53 which decode each instruction and generate the control signals required to execute the instruction and to read the next instruction from IS.

The instructions are performed in the DPC 23 by a sequence of data transfers—one in each of the eight timing intervals. Each data transfer is controlled by three simultaneous command from the PCC to the DPC:

1. A register place command (generated in block 54) which places a DPC register or circuit on the Interval Output Bus of the PCC.
2. A Bus Transfer Command (generated in bus transfer control circuits 55) which transfers the information on the Internal Output Bus to the Internal Input Bus, and
3. A Regiser Accept Command (also generated in block 54) which gates the information on the Internal Input Bus to a DPC register.

The PCC also provides auxiliary commands to the DPC such as the selection of the function to be provided by the Logic Comparator Circuit (LCC).

Memory and peripheral unit control circuits 55 of the PCC provide the control signals to the IOC including the mode bits to be transmitted to these complexes.

The instruction fetch logic of block 53 controls an Instruction Address Register IAR, Add One Register AOR, and the instruction store read for the next instruction. The next instruction is read from the Instruction Store simultaneously wit the execution of its predecessor.

The PCC also decodes the HELP instruction which is an input to the RCC that initiates a system recovery program interrupt. The instructions RMSG, WMSG, and WMCP are decoded by the PCC but are executed by the Maintenance Access Circuit 30 (MAC). The Malfunction Monitor Circuit 26 (MMC) requires decoded instructions levels from the PCC in order to sample malfunction detection circuits.

Data Processing Circuit (DPC)

Figure 5:
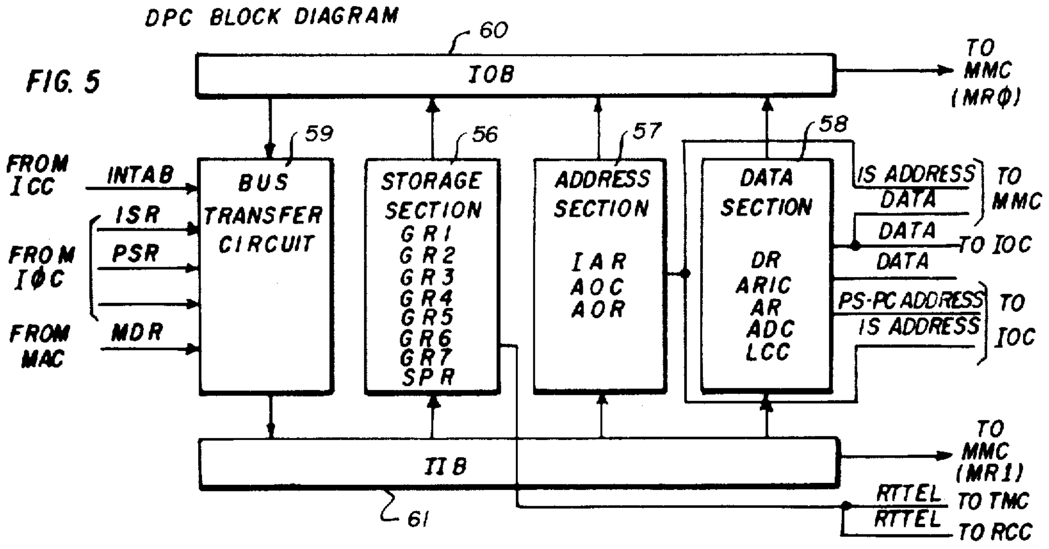
FIG. 5 is a functional block diagram of the Data Processing Circuit of the Central Processor.

The DPC 23 (see also FIG. 5) contains the registers of the CP and the circuits required to perform arithmetic, logical, decision, and data transfer operations on the information in these registers. The General Registers (GR1, . . . , GR7), in the Storage Section 56, the Special Purpose Register (SPR), also in Storage Section 56, and the Instruction Address Register (IAR) in the Address Section 57 are the program accessible registers. These registers and the operations which are performed on these registers by individual instructions are described more fully in the above-referenced application.

The remaining registers [Data Register (DR) and Arithmetic Register (AR) in Data Section 58, the Selection Register (SR), and Add One Register (AOR)] and circuits (Logic Comparator Circuit (LCC), Add Circuit (ADC) the Add One Circuit (AOC), and the Bus Transfer Circuit 59 (BTC) provide the data facilities required to implement the instruction operations on the program accessible registers.

A 32 bit Internal Input Bus (IIB) 60 is the information source for all DPC registers. In general, the DPC registers and circuits as well as other CP circuits place information on the 32 bit Internal Output Bus (IOB) 61. The Bus Transfer Circuit (BTC) 59 transmits information from the IOB 61 to the IIB 60. The information can be transferred in six ways which include complementing or not complementing the information, exchanging 16 bit halves (with or without complementing), or shifting the information left or right one bit.

A logic and compare circuit (LCC) provides a 32 bit logical AND, NOR, or EQUIVALENCE of the AR and DR and also matches the AR and DR. The ADD Circuit (ADC) provides the sum of the left half of the AR and the right half of the AR. The ADC is used for addition and subtraction and to generate PS and PU addresses. The 17 bit Instruction Address Register (IAR) is used to address the Instruction Store. The Add-One-Circuit (AOC) increments the right most 16 bits of the IAR by one. The AOC is used to compute the next instruction address (one plus the current address) which will be used if a Program Transfer does not occur.

Input Output Circuit (IOC)

The primary function of the IOC 24 (see also FIG. 6) is to provide the interface through which the Central Processor complex (CP*) gains access to the non-CP complexes (IS*, PS*, and PC*) via the external bus system. As seen diagrammatically in FIG. 6, the IOC sends data and addresses *from* the CP to the non-CP complexes and also receives and buffers data transmitted *to* the CP from non-CP complexes. The external bus system, used to transmit information between CP* and the non-CP complexes, comprises the Instruction Store Address Bus (IS*.AB), Process Store Address Bus (PS*AB), Peripheral Control Address Bus (PC*.AB), Instruction Store-Process Store Data Bus (IP*.DB), Peripheral Control Data Bus (PC*DB), Instruction Store Return Bus (IS*.RB), Process Store Return Bus (PS*.RB), and Peripheral Control Return Bus (PC*.RB).

Each bus consists of two copies which are associated with corresponding copies of IS*, PS*, and PC*. At the processing level, the IOC may be considered to use both copies of the bus without distinction between the copies. To provide the reconfiguration capability (maintenance level), the IOC transmits on or receives from copy $\phi$, copy 1, or both copies of a particular bus. The choice of bus copies is determined by the Configuration Control Circuit 25.

There are three buffer registers in the IOC: the Instruction Store Register (ISR) designated 62, the Process Store Register (PSR) 63, and the Peripheral Unit Register 64. These registers communicate with both copies of the Return Buses from IS, PS and PU respectively; and they send received data to the DPC 23 and MMC 26, as shown.

II. B. Maintenance Circuits

The functions performed by the CP maintenance circuits include the following:

1. System configuration control (CCC 25),
2. Malfunction detection (MMC 26, TMC 27, DPC 23),
3. Recovery program initiation (ICC 28),
4. Recovery program monitoring (RCC 29, TMC 27),
5. Maintenance program access to CP circuits (MAC 30, MMC 26), and
6. Manual system control (MCC 20).

The CMC detects malfunctions as follows:

1. By matching, between CP copies, all data transfers in the CP Data Processing Circuit (MMC),
2. By parity checking of all memory read operations (MMC),
3. By monitoring internal checks by the IS*, PS*, and PC* (all-seems-well checks),
4. Address echo matching of addresses sent to IS*, PS*, and PC* with the echo address returned by the complex (DPC),
5. Timing level generation checking (TMC), and
6. Excess program time checking (DPC).

Figure 8:
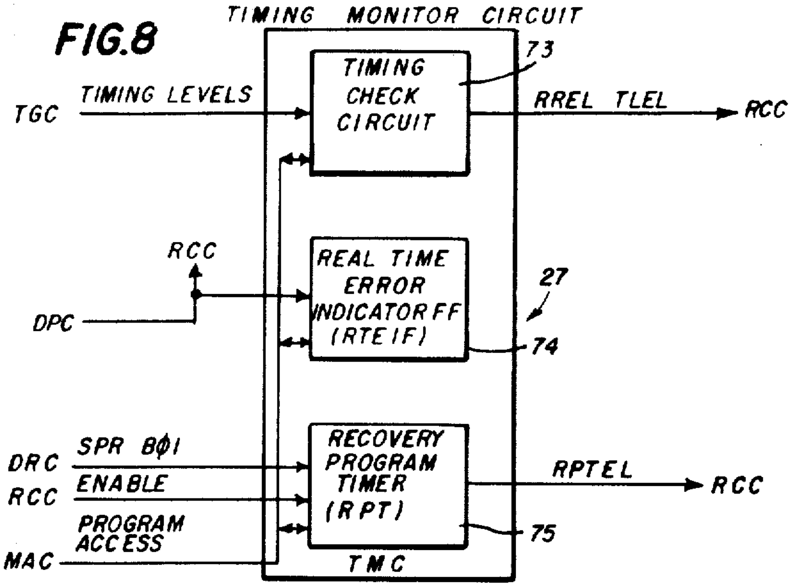
FIG. 8 is a functional block diagram of the Timing Monotor Circuit of the Central Processor.

When a malfunction is detected by MMC 26, the Interrupt control Circuit (ICC) 28 may initiate a maintenance interrupt to a recovery program. The recovery program attempts to locate the faulty unit, remove it from service, and reconfigure the complexes to a working system. The execution of the recovery programs are monitored by the TMC 27 and the RCC 29. The system recovery program is initiated (reinitiated) by the TMC 27 and the RCC 29 when higher level recovery is required. The Timing Monitor Circuit monitors recovery programs through the Recovery Program Timer (RPT) in the TMC 27 (see FIG. 8). If a recovery program fails to remain in synchronism with this timer, the TMC initiates (or re-initiates) the system recovery program through the Recovery Control Circuit. The execution of a HELP instruction may also initiate (re-initiate) the system recovery program directly through the RCC.

Malfunction Monitor Circuit (MMC)

Figure 7:
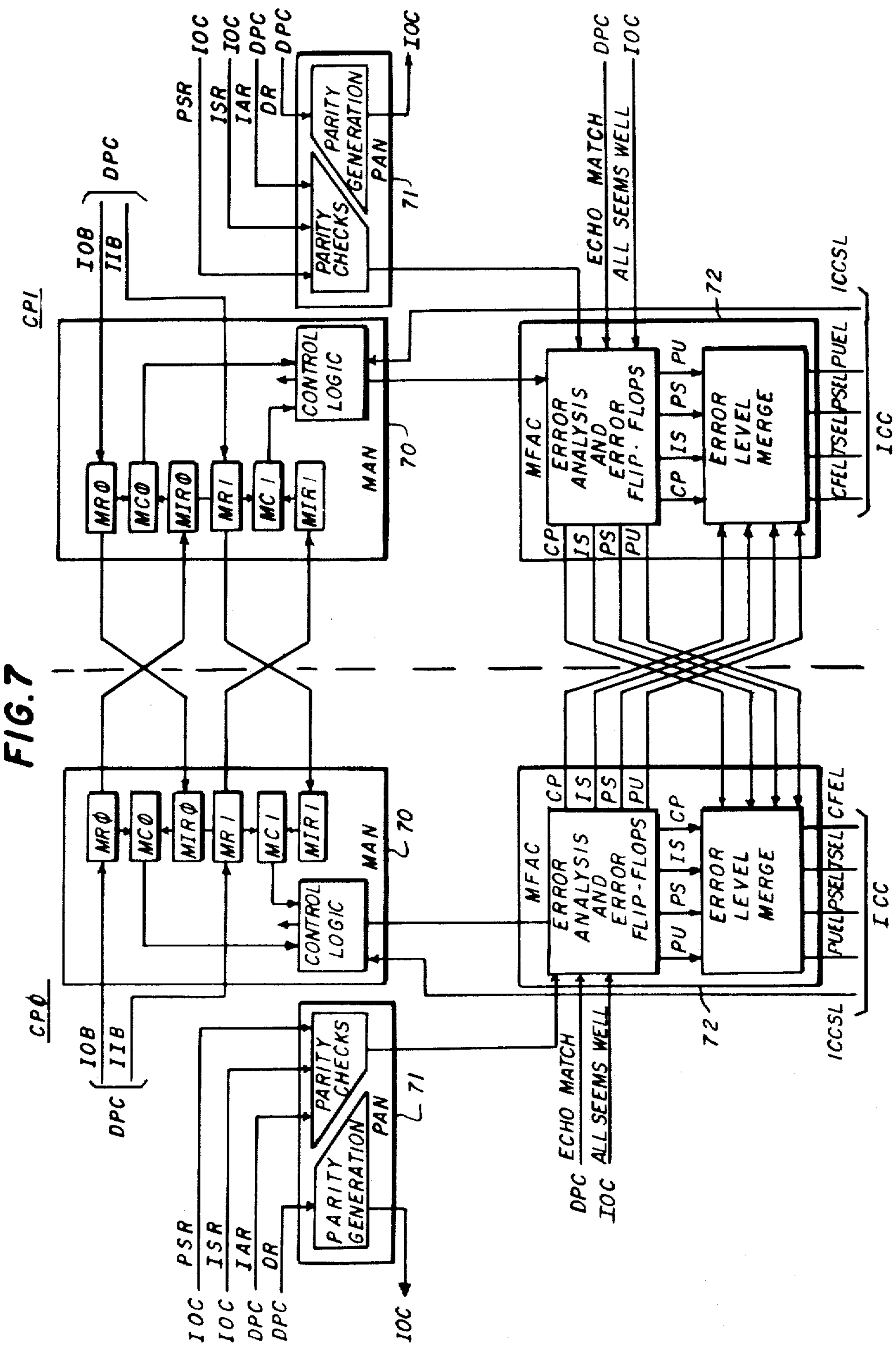
FIG. 7 is a functional block diagram of the Malfunction Monitor Circuit of the Central Processor.

The MMC 26 (see in more detail in FIG. 7) provides the following maintenance functions:

1. Detection of malfunctions during the execution of programs,
2. Classification of malfunctions into CP*, IS*, PS*, and PC* caused malfunctions,
3. Indication of a CP, IS, PS, or PC malfunction occurrence to ICC in each CP,
4. Storage of malfunction indications on error flip-flops,
5. Storage of the address of the instruction being executed when a maintenance interrupt occurs,
6. Special facilities for use by recovery programs,
7. Access to standby CP for extraction of diagnostic data through the match facilities,
8. Facility to monitor standby CP executing off line maintenance programs (Parallel Mode), and
9. Facilities for routining the MMC itself.

The Malfunction Monitor Circuit 26, shown is divided into the following three sub-circuits:

1. MAtch Network (MAN), designated 70,
2. PArity Network (PAN), designated 71, and
3. Malfunction Analysis Circuit (MFAC), designated 72.

MAtch Network (MAN) provides all inter-Central Processor matching facilities. In addition to malfunction detection, the match network can be used for extracting diagnostic data from the standby CP for routining the match network itself. The control logic within the MAN controls the match network according to match modes selected by the maintenance programs.

The PArity Network 71 (PAN) contains all the Parity Circuits used in checking the transmission and storage of information in the Instruction Store (IS*) and Process Store (PS*).

The Malfunction Analysis Circuit 72 monitors malfunction detection signals from 1. MAN (inter CP matching),
2. PAN (parity checks),
3. DPC (address echo match), and
4. IOC (all-seems-well signals).

The malfunction detection signals are sampled according to the timing intervals and instructions being executed. When a malfunction is detected an error flip-flop associated with the detection circuit is set to be used by maintenance program to isolate the source of the malfunction.

The malfunction analysis circuit classifies the malfunction according to its most likely cause (CP*, IS*, PS*, or PC*) and a corresponding error level (CPEL, ISEL, PSEL, or PUEL) is sent to the Interrupt Control Circuit (ICC) in both CP's.

Timing Monitor Circuit (TMC)

The TMC 27 (FIG. 8) provides three timing malfunction detection circuits:

1. Timing check circuit 73 which checks the timing levels generated by TGC,
2. A Real Time Timer Error FF (RTEIF) 74 which monitors the state of the overflow of the Real Time Timer RTT in DPC, and
3. A Recovery Program Timer (RPT) 75 which monitors recovery program execution.

Most failures of the active Timing Generator Circuit (TGC) do not cause inter-CP mismatches. These failures are detected by the TGC checking circuitry of the active TMC. The output of this Circuit is monitored by the active Recovery Control Circuit (RCC).

Failures of the standby TGC will cause inter-CP mismatches and are detected by the Malfunction Monitor Circuit. The standby RCC ignores error outputs of the standby TMC.

RTT, which is located in the DPC, has both an operational and a maintenance function. It provides real time synchronization for the operational programs and a sanity check on the execution. The RTT is a fourteen bit counter which is incremented by one every CP cycle (4 microseconds). The program may read or modify RTT through the Special Purpose Register (SPR). In this manner, RTT can provide time intervals of up to 65 milliseconds for the operational programs. The programs, however, must reinitialize RTT often enough to prevent the overflow from occurring. The active RCC monitors the RTT overflow. If the overlfow occurs, RTEIF is set and the RCC initiates the system recovery operation.

RPT checks the execution of the Recovery programs. RPT is a seven bit counter which, when enabled, is incremented by one every CP cycle. RPT is enabled whenever a maintenance interrupt occurs and is disabled by the recovery program through MAC when recovery is completed.

The active RCC monitors the RPT of the active TMC and initiates further system recovery operations if the recovery programs fail to reset the RPT in the correct interval. The RPT has two checking modes. When first enabled by a maintenance interrupt, the recovery program must check into the RPT through the SPR *exactly* every 128th cycle. The recovery program may change the checking mode to permit check-in before the 128th cycle. In the second mode, check-ins may not be more than 128 CP cycles apart. The recovery program changes the checking mode or disables the RPT through MAC and must do it at exactly the 128th cycle.

Interrupt Control Circuit (ICC)

Figure 9:
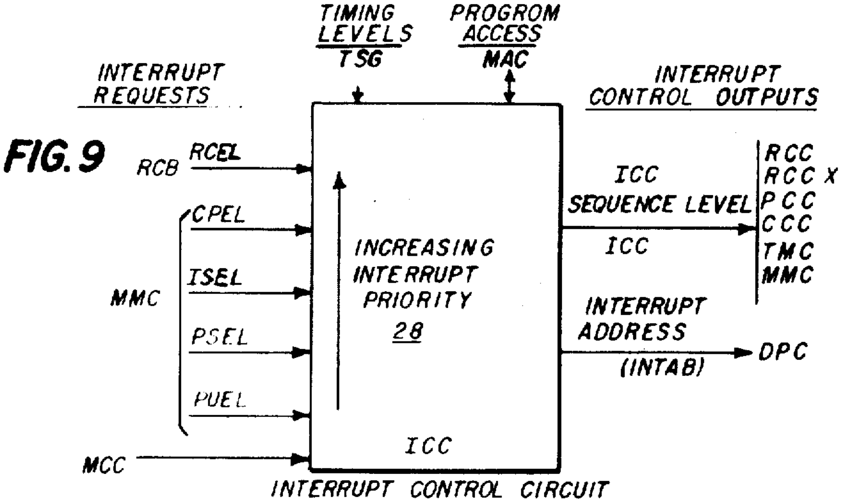
FIG. 9 is a functional block diagram of the Interrupt Control Circuit of the Central Processor.

The ICC 28 (FIG. 9) controls the execution of maintenance interrupts. A maintenance interrupt is a one-cycle wired transfer instruction which causes the CMC to begin execution of a recovery program. The malfunction detection circuits in the CP initiate maintenance interrupt whose execution takes precedence over the execution of any other CP instructions.

The ICC Provides five maintenance interrupts:

1. System Recovery.
2. CP recovery,
3. IS recovery,
4. PS recovery, and
5. PU recovery.

When an interrupt occurs, the ICC products an ICC interrupt Sequence Level (ICCSL) which controls the execution of the interrupt in the other CP circuits. The recovery program address corresponding to the interrupt is also placed on the INTerrupt Address Bus (INTAB) to the Data Processing Circuit, from which it is sent to the IS.Uφ as the address of the next instruction to be executed.

The Malfunction Monitor Circuit initiates the CP, IS, PS, and PU recovery interrupts. The Recovery Control Circuit or the Manual Control Console initiates the system recovery interrupt. An interrupt may be initiated by either circuit during the execution of an operational program when a malfunction occurs. During the execution of a recovery program additional interrupts may occur as a part of the recovery process.

To handle simultaneous interrupts and interrupts during execution of a recovery program, the ICC produces maintenance interrupts according to a priority structure. The system recovery interrupt has highest priority and cannot be inhibited. The CP, IS, PS, and PU interrupts follow respectively in descending order of priority. A CP, IS, PS, or PU interrupt can occur if the interrupt itself or a higher priority interrupt has not already occurred. CP, IS, PS, and PU interrupts may be individually inhibited by the maintenance programs.

Recovery Control Circuit (RCC)

Figure 10:
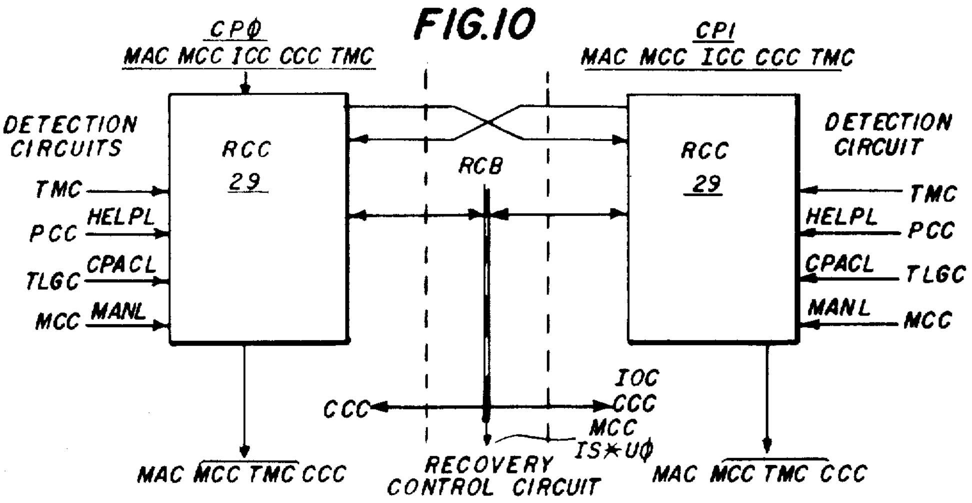
FIG. 10 is a functional block diagram of the Recovery Control Circuit of the Central Processor.

The RCC 29 (shown in duplicate copy in FIG. 10) monitors the malfunction detection circuits which cause system recovery program interrupts. The detection inputs to the RCC (RCC triggers) are produced by the timing generation check circuit in the TMC, error level from the DPC, the Recovery Program Timer in the TMC, a HELP instruction executed by the PCC, CP active unit change detected by the TGC, and a manual request from the MCC.

Only the active RCC accepts triggers and initiates system recovery action. The RCC in the Standby CP is kept in synchronism with the active RCC but cannot affect the operation of the CMC.

When a trigger to the active RCC occurs, the RCC executes a wired logic reconfiguration program and then requests the ICC to execute a system recovery program interrupt. If the system recovery program cannot be completed (i.e., the configuration is not operable), another trigger occurs. Each consecutive trigger causes the RCC to force one of the four combinations of CP*, and IS*.Uφ configurations CPφ–ISφ.Uφ, CP1–ISφ, CP1–ISI.Uφ, and CPφ–ISI.Uφ). When an operating CP*–IS*.Uφ configuration is selected, the system recovery program completes the recovery and reconfiguration process without further intervention by the RCC.

Configuration Control Circuit (CCC)

Figure 11:
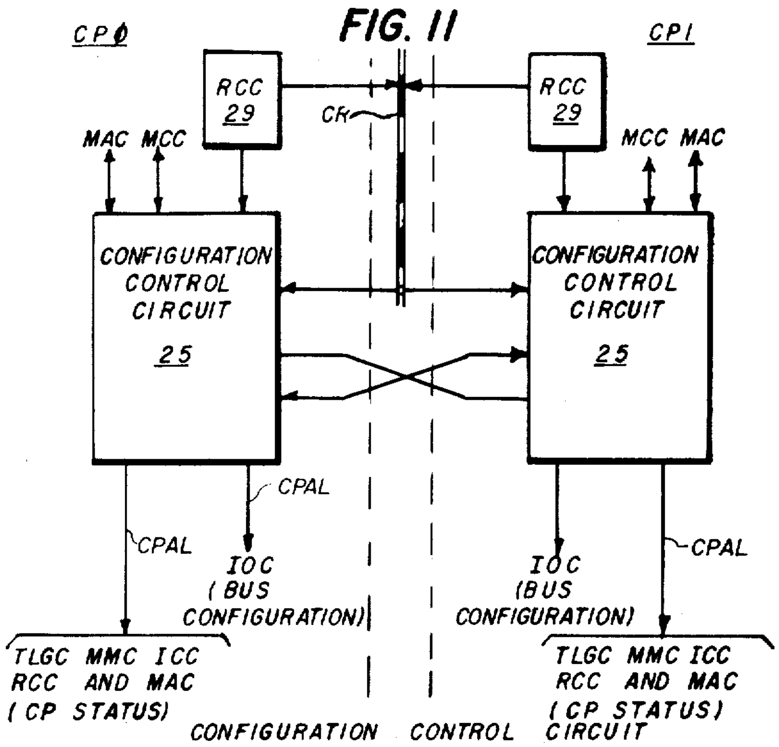
FIG. 11 is a functional block diagram of the Configuration Control Circuit of the Central Processor.

The CCC 25 (FIG. 11) defines the system configuration by controlling:

1. CP* status, and
2. The CP*–IS&, CP*–PS*, and CP*–PC* configurations.

The CP status is specified by:

1. The active CP indication,
2. The standby CP trouble status, and
3. The CP—CP error signal status (separated CPs or coupled CPs).

Each of the IS*, PS*, and PU*, has a bus system (address bus, data bus—the PS and IS share a data bus, and return bus). Each copy within IS*, PS*, and PU* is permanently associated with an individual bus copy. The CCC defines the CP*–IS*, CP*–PS*, and CP*–PC* configurations by specifying the bus copy on which each CP copy sends and receives.

The CCC first defines a primary bus copy for each of the IS, PS, and PC bus systems. The active CP always sends and receives on the primary bus. The standby CP sends and receives according to the specific bus configuration. For each primary bus copy selection, four bus configurations can be defined:

1. DUPLEX specifying that the standby CP sends on and receives from the non-primary bus copy,
2. SIMPLEX specifying that the standby CP receives from the primary bus copy while the non-primary bus copy is not used,
3. MERGED specifying that the active CP sends on both bus copies and both the standby and active CP's receive from both bus copies (i.e., the return buses are merged), and
4. SIMPLEX-UPDATE specifying that the active CP sends on both bus copies to update the secondary memory copies but the standby CP receives from the primary bus copy only.

The duplex bus configuration is used when both CP's and all units on both buses are in-service. The simplex configuration is used when a unit on the secondary bus is out of service. The merged configuration is used when units on both the primary and secondary buses are out-of-service. The update configuration is used while updating an in-service unit on the secondary bus.

A diagnostic bus configuration is also available for IS* which is used in the diagnosis and recovery of IS*.

Maintenance Access Circuit (MAC)

The MAC 30 (FIG. 12) provides maintenance program access to the CP circuits. Read Maintenance Sense Group (RMSG) is an instruction which allows a group of 32 sense points from either the active or the standby CP to be read into a general register (GR1–GR2 of the Data Processor Circuit 23, see FIG. 5). Write Maintenance Control Group (WMCG) and Write Maintenance Control Point (WMCP) are instructions which respectively allow the program to write a group of 32 maintenance control points or a single control point in either the active CP, the standby CP, or both CPs. In this context, "writing" means that each maintenance control point sets or resets one or more flip-flops.

Although the instructions are decoded and controlled by the PCC, as explained more fully in the above-identified Brenski, et al., application Ser. No. 289,718, MAC selects the control groups, transmits write data from the DPC to the maintenance control groups selected, and reads maintenance sense groups returning data to the DPC.

Maintenance sense and control groups in either the active or standby CP are always selected by the MAC in the active CP only. Write data for maintenance control groups is also always taken only from the MAC in the active CP. In other words, only the MAC in the active CP can execute MAC instructions.

Power Monitor Circuit (PMC)

A Power Monitor and Control Circuit (PMC) (not shown) controls the actions necessary to turn power on or off from a CP or controls the actions necessary to remove power from a CP in which there is a defective power supply.

In case of trouble in a power supply of a CP copy, the PMC will remove all remaining power supplied from that copy.

When power is turned back onto the CP, the PMC will guarantee that the power can be turned on only to the standby CP while keeping the other CP active.

III. Maintenance Access Circuit

As just mentioned, the Maintenance Access Circuit or MAC provides a program controlled communication channel for access to sense points and for control of flip-flops which are located throughout the CP complex. With MAC the maintenance program can:

a. control the system configuration,
b. control the malfunction detection circuitry, and
c. obtain information for fault recovery, diagnosis, and routining.

Figure 12:
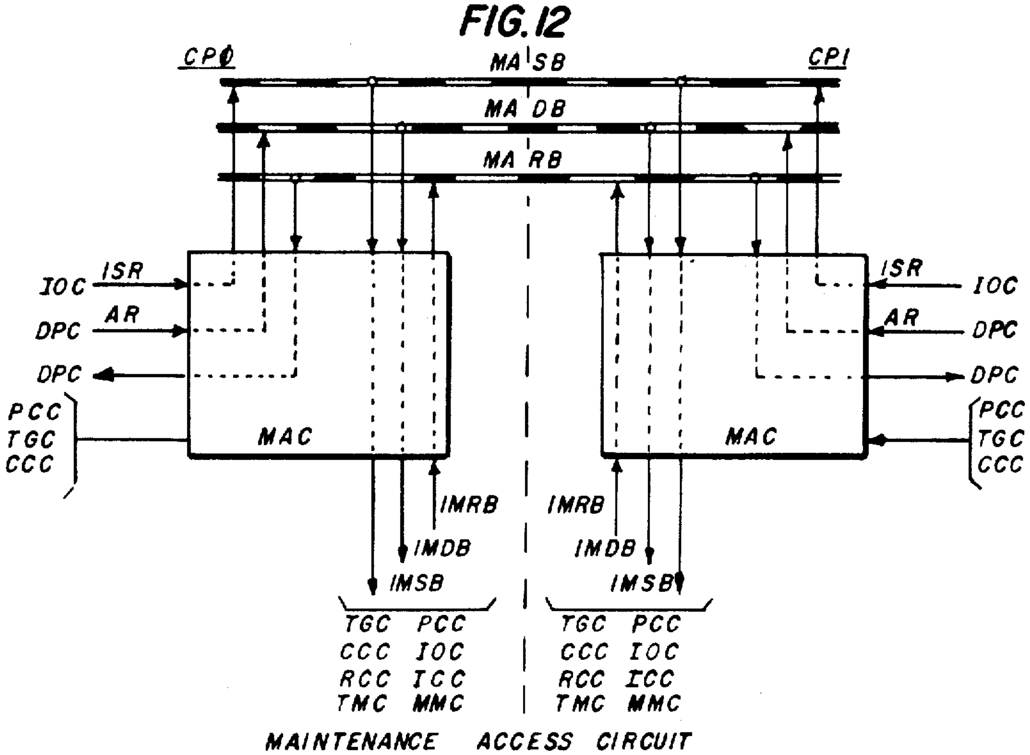
FIG. 12 is a functional block diagram of the Malfunction Monitor Circuit of the Central Processor.
Figure 13:
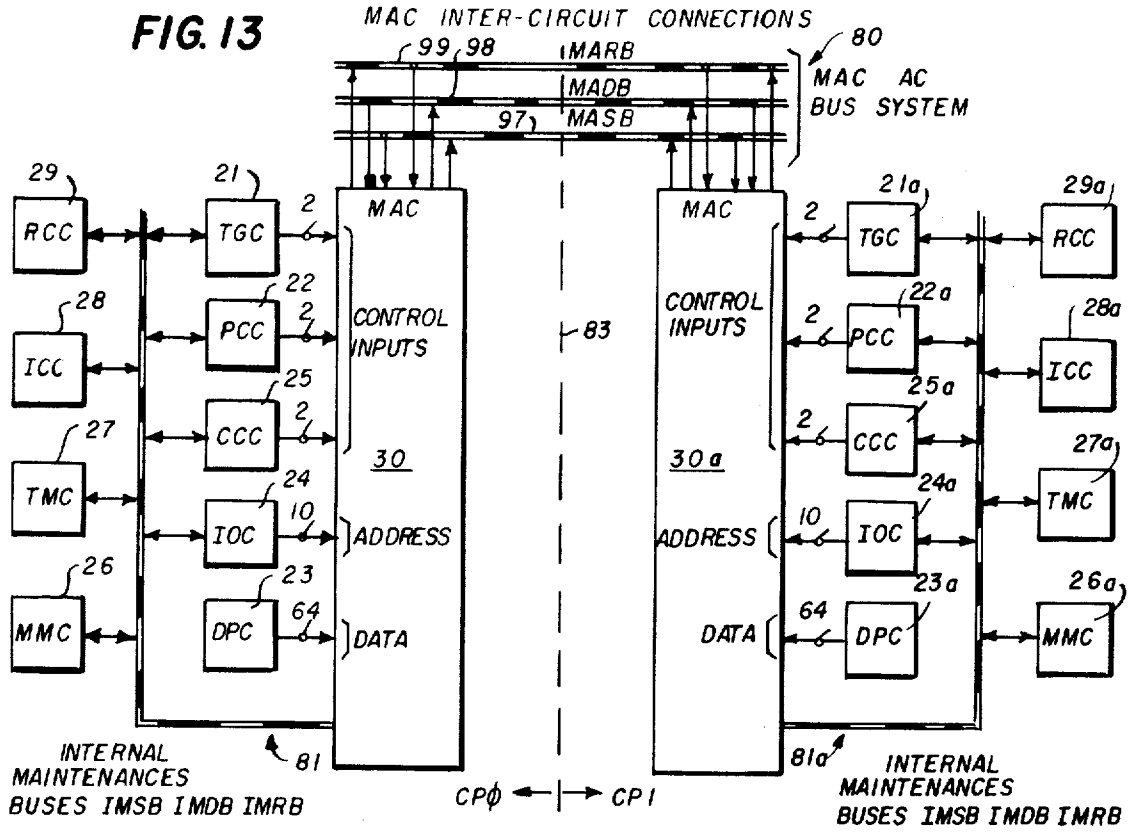
FIG. 13 is a functional block diagram of duplicate copies of the various circuits in the Central Processor as they interface with the Maintenance Access Circuits.

As shown in FIGS. 12 and 13, the MAC is duplicated at 30, 30*a*. A simplex AC bus system generally designated 80, interconnects both copies such that either one can access all sense points and control flip-flops in both CP copies. Within each CP the sense points and control points are accessed via the internal maintenance buses. Each MAC has its own internal maintenance bus, and these are designated 81, 81*a* respectively.

The sense points and control points are grouped into Maintenance Sense Point Groups (MSG) and Maintenance Control Point Groups (MCG) respectively. Each group consists up to 32 points. There are provisions for up to 16 groups of each type.

The main features of the MAC are:

a. The active CP is able to access MCP's and MSP's in both copies. In particular, the active CP is able to read and control MSG's and MCG's in the standby as long as the standby unit has power on (no matter whether it is running of not), and this is an important feature of the present invention.
b. All inter-connections between the CP's are designed such that a failure in one will not affect the operation of the other.
c. All failures are diagnosable such that no ambiguity exists between which CP contains the fault.
d. No single failure of the MAC will disable system operation.
e. Program access to information via MAC is independent of which CP (CP$\phi$ or CP1) is active; i.e., the programs which use MAC do not require different instructions depending upon whether CP$\phi$ or CP1 is active.

Still referring to FIG. 13, the circuits associated with CP$\phi$ are shown to the left of the vertical dashed line 83, and the reference numerals are the same for those previously used for the CP circuits. The corresponding individual circuits for CP1 are shown to the right of the dashed line 83, and they are designated by the same reference numeral followed by the letter "*a*."

The MAC circuits 30, 30*a* communicate with the following associated circuits within their respective Central Processors: TGC 21, 21*a;* PCC 22, 22*a;* IOC 24, 24*a;* CCC 25, 25*a;* MMC 26, 26*a;* TMC 27, 27*a;* ICC 28, 28*a;* and RCC 29, 29*a*. This communication is via the internal maintenance buses 81, 81*a*. These maintenance buses will be described in more detail subsequently. In addition, certain of the circuits communicate directly with the MAC, such as the TGC 21, 21*a;* PCC 22, 22*a;* and CCC 25, 25*a*, each of which have two control inputs to its associated MAC 30, 30*a*. The IOC 24, 24*a* feed 10 address bits into their associated MAC circuits 30, 30*a;* and the DPC circuits 23, 23*a* each feed 64 data bits into their associated MAC circuits 30, 30*a*.

Figure 15:
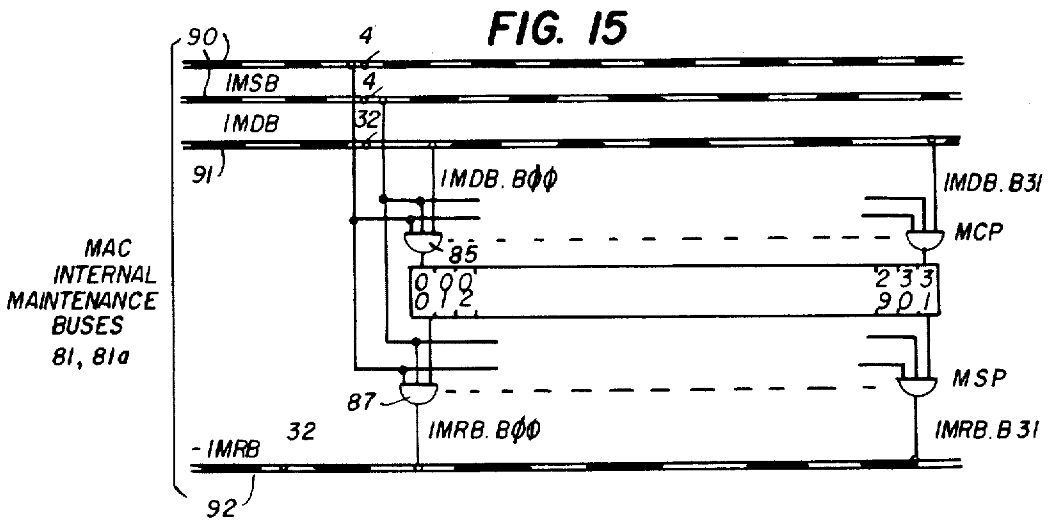
FIG. 15 is a circuit schematic diagram showing the interconnections of sense and control points to the internal maintenance buses in the Central Processor.

Referring now to FIG. 15, each of the internal maintenance buses, 81, 81*a* each includes: An internal maintenance sense bus (IMSB) which is designated 90 and includes two groups of four bits each; and Internal Maintenance Data Bus (IMDB) designated 91 and having 32 data bits; and Internal Maintenance Return Bus (IMRB) designated 92 and also including 32 bits.

Sense and Control Points

Figure 14:
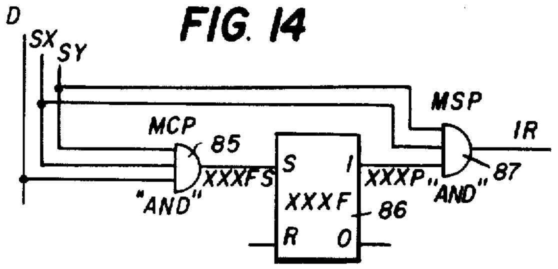
FIG. 14 is a circuit schematic diagram of a typical sense and control point within the Central Processor.

The sense and control points accessed by MAC are usually central processor control flip-flops or register flip-flops. In some cases a sense point is provided for access to a DC level. An example of both a maintenance control point (MCP) and a maintenance sense point (MSP) is shown in FIG. 14. The MCP and MSP arre not considered a part of the MAC but rather as part of the circuit in which the controlled flip-flop(s) or sensed level resides.

Referring now to FIG. 14, the control point (MCP) includes an AND gate 85 function which is connected to one input of a flip-flop 86 (either the set or reset input). In order to obtain a true signal input for the flip-flop 86, the coincidence of three pulses is required. The MCP will produce a true input to the flip-flop when SX, SY, and D are pulsed simultaneously. SX and SY form the MCP address and D is the data lead. If D is not pulsed the flip-flop state will not be affected. If program controlled reset of the flip-flop shown in FIG. 14 is required, a second MCP would be added to the reset input. The same select leads could be used but then a different data bit would be connected to reset control MCP. Note that one MCP can be used to simultaneously control more than one flip-flop.

The sense point (MSP) also includes an AND gate, see 87. The sense point inputs are two select signals (SX and SY) and the level to be sensed. The output is connected to the internal maintenance return bus, to be discussed presently. As shown in FIG. 14, a true sense point output will be obtained only when SX and SY are pulsed simultaneously and the flip-flop output is "true."

For addressing of the sense and control points the MCP's and MSP's are grouped to form Maintenance Control Groups (MCG) and Maintenance Sense Groups (MSG) respectively. Each group can consist of up to 32 control points or 32 sense points. There are provisions for 16 MCG groups and 16 MSG groups. All points within a group are addressed by same 1 out of 4 X select code and 1 out of 4 Y select code on the 8 bit Internal Maintenance Select Bus (IMSB) 90. The data input for each MCP is obtained from a different bit position of the MAC Data Bus 91, as will be more fully explained. Likewise, each sense point output within an MSG, is connected to a different bit position of the Internal Maintenance Return Bus (IMRB) 92. An example of a group is shown in FIG. 15. The following nomenclature is used for the maintenance points. The MCP's are named by following the mnemonic which names the controlled flip-flop by either an S or R. An S is used if the MCP is connected to the set input and an R is used if the MCP is connected to the reset input. The MSP's are not named. They are sometimes referred to by the name of the level or flip-flop that is sensed. For example, if the flip-flop shown in FIG. 14 is named XXXF, then the MCP connected to the set input is named XXXFS. If an MCP were added to control the reset input it would be named XXXFR.

When an MCP is used to control more than one flip-flop a unique mnemonic must be generated which ends with either S or R.

Three CP instructions command MAC operations, These are:

a. WMCG Z, X — Write maintenance control group specified by Z; the data word to be writted at Z is specified by X, b. WMCP Z, B — Write maintenance Control Point specified by B in group specified by Z, c. RMSG Z, X — Read maintenance Sense Group specified by Z; sensed information is to be placed in Register X.

Figure 16:
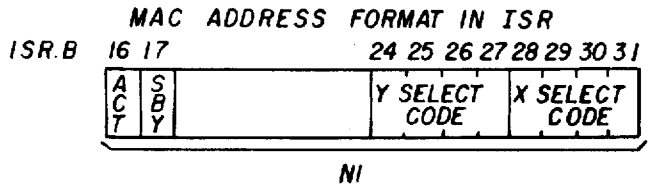
FIG. 16 is a diagrammatic showing of the MAC address format in the Intruction Store Register.

The format for the above three instructions is explained in more detail in the above-identified Brenski, et al. application Ser. No. 289,718, particularly in FIGS. 129, 129A and 94 respectively. Each of these instructions, when received in the Instruction Store Register 62 of the Input Output Circuit 24 (FIG. 6) has a format as indicated in FIG. 16. The decoding of the instruction is performed in the Data Processing Circuit 23, as explained in the referenced application.

As seen in FIG. 16, only the right half of the Instruction Store Register 62 (Bits B16–B31) are used. Bit 16 is a 1 when the active standby is being selected; and bit 17 is a 1 when the standby CP is selected. Bits 24–27 inclusive define the Y-select code which is a 1 and 4 select – that is, only one of bits 24–27 will be a 1. Similarly, bits 28–31 inclusive form the X select code which is also a 1 out of 4 select. Each of the instructions is explained more fully below.

Write Maintenance Control Group (WMCG)

The WMCG instruction operates the control points in the addressed MCG that have a logical 1 in the corresponding bit positions of the CP general register (i.e., GR1–GR7 in DPC, see FIG. 5) specified by X. If the specified register contains a 1 in bit position (GRX.B) then the control point in bit position (MCG.B) of the addressed MCG will be operated. If GRX.B–0 then the corresponding control point MCG.B will not be affected. The MCG address (the Z field) is specified in two parts:

a. The rightmost 8 bits ($(\binom{4}{1}) \times (\binom{4}{1})$ code) of the ISR specify which MCG is selected, as explained in connection with FIG. 16 above, b. the copy selected (active, standby or both) is specified by bits 16 and 17 of the ISR.

Write Maintenance Control Point (WMCP)

This instruction is the same as WMCG except that instead of specifying a general register, a single bit is specified. The data word will control a single 1 in the bit position specified by B. Thus, only one point (MCG.B) of the addressed MCG will be operated or controlled.

Read Maintenance Sense Group (RMSG)

RMSG is provided to read sense point groups. The address field of this instruction has the same format as for the instruction WMCG. However, if both the active and standby copies are specified, a logical OR function is performed on the sensed information from both copies. The sensed information is placed in the general register specified by X.

Note, however, that unimplemented sense point groups will return as zero. Unimplemented sense points in an implemented group will return as 1s.

Note on Addressing

It is possible to have something other than a $\binom{4}{1} \times \binom{4}{1}$ code placed in the Z field of the instruction. For example, all MCGs could be operated simultaneously by specifying Z = 140377 octal.

Figure 17:
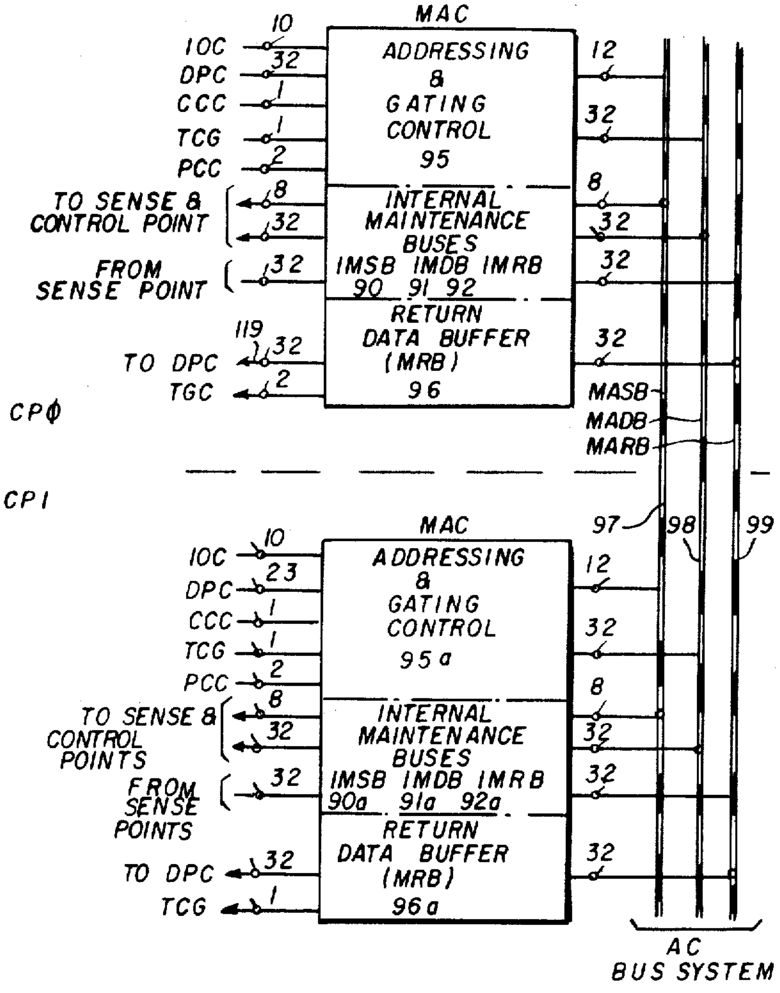
FIG. 17 is a more detailed functional block diagram of duplicate copies of the Maintenance Access Circuits and their associated interconnecting buses.

Turning now to FIG. 17, each of the MAC circuits 30, **30*a*** has three major sections:

a. addressing and gating control circuitry, designated 95 and **95*a* respectively, b. the internal maintenance buses 90, 91, 92 and 90*a*, 91*a*, 92*a* which are the DC buses already described in connection with FIG. 15, and c. a return data buffer, designated 96 and 96a**.

The MAC circuits 30, **30*a*** are inter-connected by a simplex AC bus system including:

a. select bus 97 (MASB) (12 bits), b. data bus 98 (MADB) (32 bits), and c. return bus 99 (MARB) (32 bits).

Addressing and Gating Control

Figure 6:
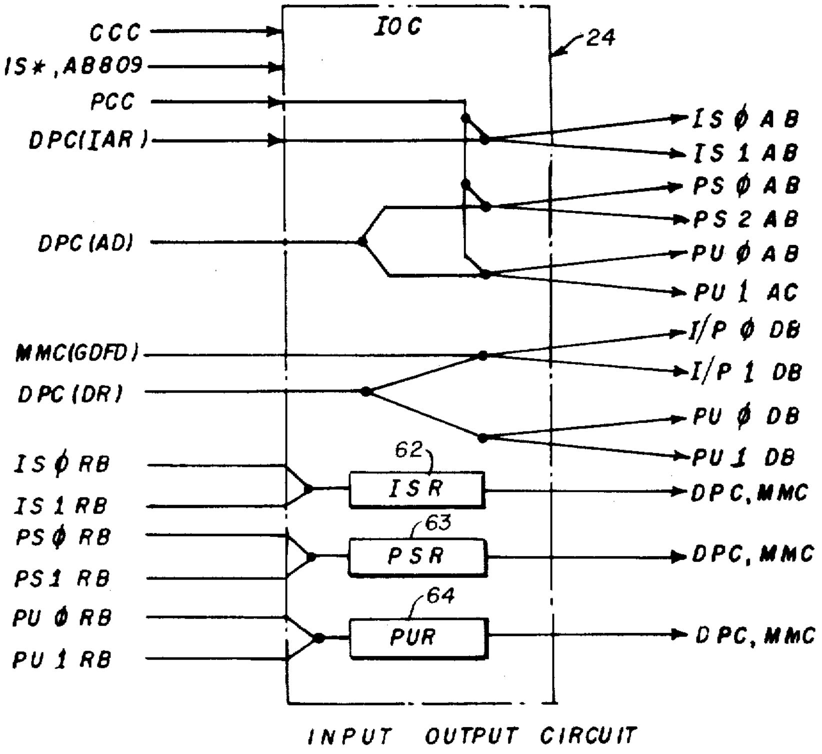
FIG. 6 is a functional block diagram of the Input/Output Circuit of the Central Processor.
Figures 18, 19, 20:
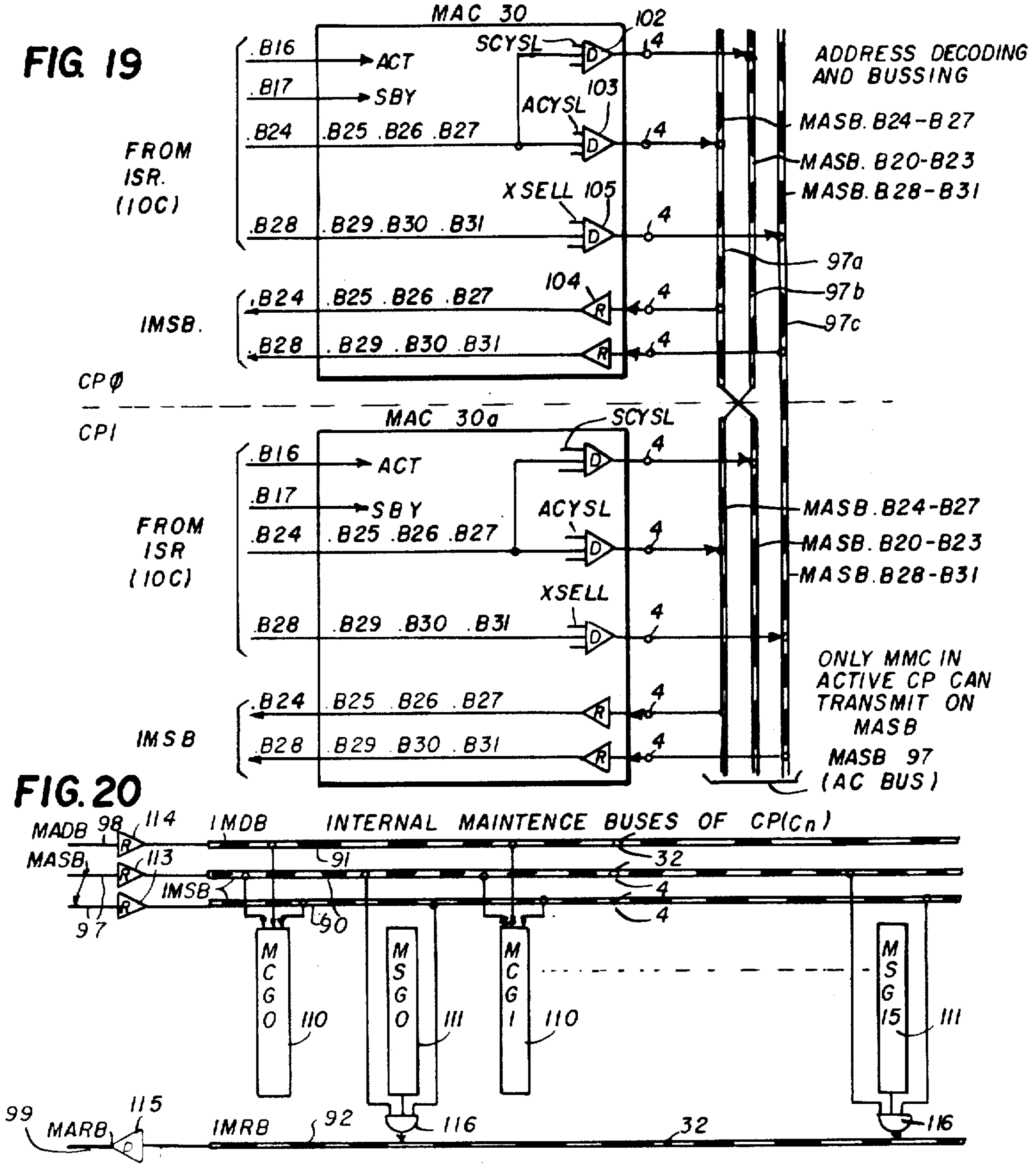
FIG. 18 is a chart illustrating coincident pulse selection of the MAC sense and control points.
FIG. 19 is a line diagram partially in circuit schematic illustrating address decoding and busing within MAC.
FIG. 20 is a functional block diagram illustrating the internal maintenance bus configuration for the Maintenance Access Circuit.

The MAC can address up to 16 MCG's and 16 MSG's in each CP. As explained, the MPG address is specified by 10 bits from the ISR 62 (FIG. 6). Eight bits (ISR.B24 through ISR.B31) specify which of the 16 duplicated MCG's or MSG's is being addressed. ISR.B16 and ISR.B17 specify which copy (active only, standby only or active and standby) is being addressed. The eight address bits are in $\binom{4}{1}$ X select and $\binom{4}{1}$ Y select code. ISR.B28 and ISR.B31 specify the X select and ISR.B24 and ISR.B27 specify the Y select. FIG. 16 shows the ISR address field format for MAC instructions. The table shown in FIG. 18 illustrates the MCG and MSG selection by the X-Y selection scheme. An MCG is distinguished from an MSG by type of instruction; i.e., write or read.

FIG. 19 shows a diagrammatic view of the address busing. The MAC Select Bus (97 of FIG. 13) comprises three separate four-bit buses 97*a*, 97*b* and 97*c*. It will be noted that bus 97*a* comprises Bits B24–B27 in CP$\phi$ but Bits B20–B23 in CP1. Similarly, bus 97*b* comprises Bits B24–B27 in CP1 but Bits B20–B23 in CP$\phi$.

It will be observed that data placed on bus 97*a* can be received only in CP$\phi$, and that data placed on bus 97*b* can be received only in CP1. This, in cooperation with the addressing and gating control circuitry to be described presently, insures that the standby Central Processor cannot execute MAC instructions; and it is considered an important aspect of the present invention because it is through the MAC circuitry that the standby Central Processor is activated. It could otherwise possibly occur that both Central Processors would assume an active status. That is to say, only the MAC circuit in the active Central Processor can transmit on the MAC Select Bus (MASCB) 97.

The Y select code (B24–B27) is coupled from the Instruction Store Register of the Input/Output Circuit to two sets of Y select drivers, only one from each set being illustrated in FIG. 19, and designated respectively by reference numerals 102 and 103. The output of the driver 102 is connected to one line of bus 97b; and the output of driver 103 is connected to one line of bus 97a. Bus 97a, in turn, transmits only to the internal maintenance select bus (B24–B27) for MAC 30 by means of AC line receiver 104. Bit B17 of the ISR which designates standby is coupled to enable the driver 102; whereas the active bit (B16) enables driver 103. It will thus be observed that when the MAC circuit 30 is in the active CP, it is the only MAC which can transmit on the Maintenance Select Bus 97. The X-select code (B28–B31) is coupled by means of drivers 105 directly to bus 97*c*. The X-select data, therefore, is coupled to the Internal Maintenance Select Buses for both copies of the Central Processor, but since it is a coincident select, requiring both lines to be pulsed, no effect is had in the inactive copy. It will be observed from FIG. 19 that the MAC in CP1 has similar circuitry. This circuitry enables the following selection alternatives:

1. active copy of CP only;
2. standby copy of CP only; or
3. both active and standby copies of CP. It will also be observed that the programmer, at the time of writing the program, does not have to know which copy is active nor does he have to account for the fact that one or the other only is active.

The gating control transmits address select pulses and data pulses on the MASB 97 (i.e., buses 97*a*–97*c*) and MADB 98, both of which are AC buses. Only the MAC in the active CP is allowed to transmit on these two buses. Four sets of drivers are provided:

a. active copy Y select 103 (four drivers),
b. standby copy Y select 102 (four drivers),
c. X select 105 (four drivers), and
d. Data (32 drivers), not shown.

All transmission of address and data information from MAC is done in T3PL when a RMSG, WMCG or WMCP is being executed. In addition to the 10 address bits in the ISR, MAC is responsive to the following inputs:

a. CPAL — Central Processor Active Level; it specifies that the appropriate Central Processor is the active copy,
b. MARL — Maintenance Access Read Level; it specifies that a maintenance access read instruction is being executed,
c. MAWL — Maintenance Access Write Level; it specifies that a Maintenance Access Write Instruction is being executed,
d. T3PL — Timing Interval 3 Place Level; it specifies that the Central Processor is in timing interval 3 (500 nsec. long). See FIG. 48 and related text of the Brenski, et al. application, Ser. No. 289,718.

The logic equations for enabling the four sets of AC cable drivers are given below. Whenever these are true and the appropriate address or data level is true, a 500 nsec. pulse is generated on the associated AC bus lead.

a. Active Copy Y SELECT ENABLE (gates 102)
ACYSL = CPAL · T3PL · ACT · (MARL + MAWL).
b. Standby Copy Y SELECT ENABLE (gates 102)
SCYSL = CPAL · T3PL · SBY · (MARL + MAWL).
c. X SELECT ENABLE (gates 105)
XSELL = CPAL · T3PL · (MARL + MAWL).
d. DATA ENABLE
DATEL = CPAL · T3PL · MAWL.

The internal maintenance buses (FIGS. 15 and 20) consist of two input buses 90 and 91:

IMSB — eight bits wide, and including two groups of four for X and Y selection pulses (bus 90),
IMDB — 32 bits wide for data inputs (bus 91), and one output bus:

IMRB — 32 bits wide for data outputs (bus 92).

FIG. 20 is a block diagram of the internal maintenance buses 90–92, MCG's 110 and MSG's 111. Each MAC contains a set of such internal maintenance buses for distributing the select and data pulses throughout the Central Processor copy.

As mentioned, the external maintenance buses are AC buses, but the internal maintenance are DC buses.

The IMSB and IMDB 91 receive the information transmitted on the MASB 97 and MADB 98 via AC cable receivers 113 and 114 respectively in FIG. 20. This information is merely repeated on the IMSB and IMDB to the sense and control points. Note that the reception of information is not dependent upon anything but the AC buses. Because of this, the MAC in the active central processor can access sense points and control points in the standby even when the standby is stopped (with power on). This is considered to be an important aspect of the present invention because it permits control of the standby CP for diagnostics, recovery and even starting, irregardless of the state of the standby CP.

The IMRB 92 receives information from the sense and control groups 110, 111 and transmits it onto the MARB 99 via cable drivers 115. This operation is independent of all other central processor operations; i.e., no timing or control signals are required from any other central processor circuits. The coincidence of two select pulses and a true data level at a sense point will cause a pulse to be generated on the IMRB 92. This pulse is repeated onto the MARB via the AC cable driver 115. In FIG. 20, the sense points are shown as AND gates 116 connected to IMRB bus leads. The actual implementation may make use of an AND-OR tree.

The return data buffer 96 (MDR) is coupled via AC cable receivers to the MARB 99. The MDR consists of 32 set-reset flip-flops, one for each separate line in the MARB 99. Each flip-flop is connected to a different MARB cable receiver. Each flip-flop is set to the true state whenever a data pulse is received from the associated MARB bus lead.

During the execution of a read maintenance sense group instruction (RMSG Z, X) the entire MDR 96 is reset during T2PL. Interval T3PL causes the select pulses to be transmitted and sensed information to be gated on the MARB 99 during T3PL and T4PL, as explained below. The MDR flip-flops will be set (or remain reset) by the information received from the MARB. The MDR contents is stable by the end of T4PL and available to the Data Processing Circuit (DPC) via bus 119.

The operation of maintenance access control points MCP's and sense points MSP's is dependent upon the coincidence of pulses at the inputs. FIG. 21 shows that at the input to the internal maintenance buses a mimimum pulse overlap of 340 nsec. will be obtained when the initial control pulse source is 500 nsec. long. If the minimum allowable overlap at the MCP inputs is 200 nsec., the pulse dispersion caused by the IMSB and IMDB cannot exceed 140 nsec.

When executing a read maintenance point group instruction (RMSG) the minimum allowable pulse length into the MDR is 100 nsec. Thus, the total dispersion of select signals to the sense points and the pulse shrinkage from the sense point to the MDR inputs must be small enough such that a minimum pulse length of 100 nsec. at the MDR will result.

The levels being sensed by the MSP's must be stable during the latter half of T3PL and the first half of T4PL.

The following is a list of the first five sense and control groups that have been defined. Others are located at various places in the MMC, PCC, CCC, ICC, TGC, RCC, IOC, and TMC, as required.

a. MCG-0 — 32 bits to set side of all bits of MATCH REGISTER $\phi$ (MR$\phi$).
b. MSG-0 — 32 bits of MATCH REGISTER $\phi$ (MR$\phi$).
c. MCG-1 — 32 bits to set side of all bits of MATCH IMAGE REGISTER $\phi$ (MIR$\phi$).
d. MSG-1 — 32 bits of MATCH IMAGE REGISTER $\phi$ (MIR$\phi$).
e. MCG-2 — 32 bits to set side of all bits of MATCH REGISTER 1 (MR1).
f. MSG-2 — 32 bits of MATCH REGISTER 1 (MR1).
g. MCG-3 — 32 bits to set side of all bits of MATCH IMAGE REGISTER (MIR1).
h. MSG-3 — 32 bits of MATCH IMAGE REGISTER 1 (MIR1).
i. MCG-5 — 32 bits reserved for process control circuit requirements (not yet defined).
j. MSG-5 — 32 bits reserved for process control (contents not yet defined).

The MAC is provided purely for maintenance program use. It should never be accessed by the call processing programs. No automatic malfunction hardware is included. All malfunction detection will be accomplished through periodic routining and cross checks by the maintenance programs at time of MAC use.

If the IMRB is implemented using an AND-OR tree the inputs to the tree should be arranged to minimize the number of gates which cannot be completely exercised. One way of accomplishing this is to pair the completely exercisable points (such as the MATCH REGISTER sense points) with points which cannot be exercised. Then, only the inputs related to the non-exercisable points will not be routinable.

INPUTS

Prime Inputs

| | | |
|---|---|---|
| IOC: | ISR.B16; | Address; specifies active copy. |
| | ISR.B17; | Address; specifies standby copy. |
| | ISR.B24 through ISR.B31; | Binary address. |
| DPC: | AR.B00 through AR.B31; | Input data word; true signal required. |
| CCC: | CPAL; | Central Processor Active Level. |
| TLGC: | T3PL; | Timing Interval 3 Place Level. |
| | T2PL; | Timing Interval 2 Place Level. |
| PCC: | MARL; | Maintenance Access Read Level, specifies that a RMPG instruction is being executed. |
| | MAWL; | Maintenance Access Write Level; specifies that a WMPG or WMPT instruction is being executed. |

Bus Inputs

| | |
|---|---|
| EXTERNAL | MASB.B24 through .B31 X and Y SELECT PULSES. |
| EXTERNAL: | MADB.B00 through .B31 DATA Word. |
| EXTERNAL: | MARB.B00 through .B31 RETURN DATA Word. |
| *: | IMRB.B00 through .B31 Internal Maintenance Return Bus |

*TLGC, MMC, PCC, CCC, RCC, ICC, TMC and IOC.

Outputs

| | | |
|---|---|---|
| DPC: | MDR.B00 through MDR.31 | Maintenance Data Register Outputs. |
| *: | IMSB.B24 through IMSB.B31 | Internal Maintenance Select Bus. |
| *: | IMDB.B00 through IMDB.B31 | Internal Maintenance Data Bus. |
| EXTERNAL: | MASB.B20 through MASB.B31 | Maintenance Access Select Bus. |
| EXTERNAL: | MADB.B00 through MADB.B31 | Maintenance Access Data Bus. |
| EXTERNAL: | MARB.B00 through MARB.B31 | Maintenance Access Return Bus. |

*TLGC, MMC, PCC, CCC, RCC, ICC, TMC, and IOC.

Having thus described in detail a preferred embodiment of the invention, persons skilled in the art will be able to modify certain of the structure which has been described and to substitute equivalent elements for those disclosed while continuing to practice the principal of the invention; and it is, therefore, intended that all such modifications and substitutions be covered as they are embraced within the spirit and scope of the appended claims.

We claim:

1. A programmable digital data processing system including first and second data processors, each having processing circuits, maintenance circuits, a plurality of internal sense circuit points in said processing and maintenance circuits and a plurality of internal control circuit points in said processing and maintenance circuits, each of said data processors being responsive to a read maintenance instruction and a write maintenance instruction, each of said instructions including address signals representative of preselected ones of said control and sense circuit points, said data processors cooperating such that only one data processor is active and the other is passive at any one time, wherein the improvement comprises: maintenance access circuit means in each of said processors, each including maintenance access circuit means internal conductive bus means including an internal maintenance select bus, an internal maintenance data bus and an internal maintenance return bus, said buses coupling said maintenance access circuit means with said selected circuit points in its associated data processor;

addressing and gating control circuit means responsive to maintenance address signals in said instructions for communicating said maintenance access circuit means along said internal select but with selected ones of said control or sense circuit points represented by said address signals in an associated maintenance instruction;

first gate means at each of said selected circuit points responsive to said maintenance address signals in a write maintenance instruction and a data signal on said internal data bus for writing the associated data signal to each selected control circuit point;

second gate means at each of said sense circuit points responsive to said maintenance address signals in a read maintenance instruction and a sense data signal at an associated sense point for coupling said sense data signal to said return bus; and a return data buffer register circuit for receiving sensed data signals from said return bus in response to a read maintenance instruction for temporarily storing said sensed data signals for use by said data processor; and external conductive bus means comprising an external maintenance select bus, an external maintenance data bus and an external maintenance return bus, all of said external buses interconnecting only both of said maintenance access circuit means for coupling address, data and return signals therebetween in response to said maintenance instructions.

2. The system of claim 1 wherein the active one of said data processors generates an active level signal only when active and wherein said maintenance instructions include signals representative of addresses for the active and standby processors, and wherein said addressing and gating control circuit means of said maintenance access circuit means is responsive only to the active level signal of its associated processor and is responsive to the active select and standby select signals of said instruction words, said maintenance access circuit means further including select circuit means for selectively addressing either said active processor only, said standby processor only, or both said active and standby processors in response to said active and passive select signals of said instruction words.

3. The system of claim 2 wherein said select circuit means includes a first standby select gate responsive only to said standby select signals of said instruction word and a second active select gate responsive only to said active select signals of said instruction words; and wherein said external select bus includes a first external select bus communicating said standby select gate with the maintenance access circuit means in the other central processor and a second external select bus coupling said active select gate with the maintenance access circuit means in its own processor.

4. The system of claim 3 wherein each of said external bus means is an alternating current bus system and wherein each of said internal maintenance buses is a direct current bus system, wherein the active central processor has access to the maintenance access circuit means of the standby central processor even though the standby central processor is stopped but with power on.

5. A programmable digital data processor system including first and second data processors, each having processing circuits, maintenance circuits, a plurality of internal sense circuit points in said processing and maintenance circuits and a plurality of internal control circuit points in said processing and maintenance circuits, each of said data processors being responsive to a read maintenance instruction and a write maintenance instruction, each of said instructions including address signals representative of preselected ones of said control and sense circuit points, said address signals including X-select and Y-select address signals, said address signals further including an active select signal and a standby select signal, said data processor cooperating such that only one data processor is active and the other is standby at one time, wherein the improvement comprises: maintenance access circuit means in each of said processors, each maintenance access circuit means including maintenance access circuit means for writing data signals and selected ones of said control circuit points in response to a write maintenance instruction and for reading output signals from selected ones of said sense circuit points in response to a read maintenance instruction, said maintenance access circuit including internal conductive bus means including an internal maintenance select bus, an internal maintenance data bus and an internal maintenance return bus coupling said maintenance access circuit means with said selected circuit points in its associated data processor;

addressing and gating control circuit means including a standby select gate means, an active select gate means and an X-select gate means, said standby select gate means and said active select gate means receiving the Y-select address signals and responsive respectively to active select and standby select signals in said instruction, said Y-select gate means receiving the Y-select address signals of said instructions;

gate means at each of said select circuit points responsive to said maintenance address signals in a write maintenance instruction and an internal data bus for writing the associated data signal to each selected control circuit point;

second gate means at each of said sense circuit points responsive to said maintenance address signals in a read maintenance instruction and a sense data signal at an associated sense point for coupling said sense data signal to said return bus; and a return data buffer register circuit for receiving sensed data signals from said internal return bus in response to a read maintenance instruction for temporarily storing said sensed data signals for use by said data processor;

external conductive bus means including an external maintenance select bus, an external maintenance data bus and an external maintenance return bus, said external maintenance select bus including a first bus coupling the Y-select address signals of said active select gate means of a first maintenance access circuit means and the Y-select address signals of said standby select gate means of the other maintenance access circuit means to the internal maintenance select bus of said first maintenance access circuit;

a second bus coupling the Y-select address signals of said active select gate means of said other maintenance access circuit means and the Y-select address signals of said standby select gate means of said first maintenance access circuit means to the internal maintenance select bus of said other maintenance access circuit means; and a third bus coupling the outputs of said X-select gate means of both maintenance access circuit means to both of said internal maintenance select buses; whereby the maintenance access circuit means in the active data processor may address the circuit points in either the active data processor only, the standby data processor only, or both the active and standby data processors without regard to which of the data processors is active or standby at the time.

6. A programmable digital data processing system including first and second data processors, each having processing circuits, maintenance circuits, a plurality of internal sense circuit points in said processing system and maintenance circuits and a plurality of internal control circuit points in said processing and maintenance circuits, each of said data processors being responsive to a read maintenance instruction and a write maintenance instruction, each of said instructions including X-select address signals and Y-select address signals, the conicidence of which represents preselected ones of said control and sense circuit points, said data processors cooperating such that only one data processor is active and the other is standby at any one time, the active data processor generating an activity level signal, wherein the improvement comprises:

maintenance access circuit means in each of said processors, each maintenance access circuit means including internal conductive bus means including an internal maintenance select bus, an internal maintenance data bus, internal maintenance return bus coupling said maintenance access circuit means with said selected circuit points in its associated data processor;

addressing and gating circuit means responsive to maintenance address signals in said instructions for communicating said maintenance access circuit means with external conductive bus means;

gate means in each of said selected circuit points responsive to said maintenance address signals in a write maintenance instruction and the data signal on said internal data bus for writing the associated data signal to each selected control circuit point;

second gate means at each of said sense circuit points responsive to said maintenance address signals in a read maintenance instruction and a sense data signal at an associated sense point for coupling said sense data signal to said return bus; and a return data buffer register circuit for receiving sensed data signals from said return bus in response to a read maintenance instruction for temporarily storing said sensed data signals for use by its associated data processor; and external AC conductive bus means including an external maintenance select bus, an external maintenance data bus, and an external maintenance return bus interconnecting only both of said maintenance access circuit means for coupling address, data and return signal pulses therebetween in response to said maintenance instructions, the coincidence of address pulses transmitted to the standby processor gating the information in the associated sense circuit points in said standby processor onto the internal maintenance return bus of said central processor and thence along said AC external maintenance return bus to said return data buffer register circuit of said active maintenance access circuit means, said sensing action in said standby processor being dependent only upon the coincidence of said X-select and Y-select address signals and power at said standby processor.

7. A programmable digital data processor system including first and second data processors, each having processing circuits, maintenance circuits, a plurality of internal sense circuit points in said processing and maintenance circuits and a plurality of internal control circuit points in said processing and maintenance circuits, each of said data processors being responsive to a read maintenance instruction and a write maintenance instruction, each of said instructions including address signals representative of preselected ones of said control and sense circuit points, said address signals including an active select signal and a standby select signal, each of said data processors cooperating such that only one data processor is active and the other is standby at one time, wherein the improvement comprises:

maintenance access circuit means in each of said data processors for writing data signals at selected ones of said control circuit points in response to a write maintenance instruction and for reading output signals from selected ones of said sense circuit points in response to a read maintenance instruction;

external bus means comprising address conductors and data conductors with connections only to said maintenance access circuit means of both of said data processors;

input address gate means in the maintenance access circuit means of each data processor with means effective in the active data processor to supply signals to said address conductors of the external bus in accordance with the address signals of said maintenance instructions, with at least some of the address signals supplied to different address conductors depending on the active select signal and standby select signal;

means coupling the external bus means via receiving means of the maintenance access circuits in each data processor to said internal sense circuit points and internal control circuit points for executing said maintenance instructions selecting said points in either the active or the standby data processor according to said active select signal or said standby select signal being present in the instruction.

8. The processor system of claim 7, wherein at least a portion of the address conductors of the external bus means are duplicated in a first set and a second set;

wherein in said first data processor said input address gate means includes gate means enabled responsive to the active select signal to couple address signals to the first set and gate means enabled responsive to the standby select signal to couple the same address signals to the second set; and in said second data processor said input address gate means includes corresponding gate means enabled respectively responsive to the active select signal and standby select signal to couple corresponding address signals to the second set or first set respectively; the input address gate means being enabled only in the active data processor;

wherein said first set of address conductors is coupled via said receiving means only in the first data processor and the second set is coupled via receiving means only in the second data processor, the data conductors and remaining address conductors being coupled via receiving means in both data processors.

* * * * *

UNITED STATES PATENT OFFICE

CERTIFICATE OF CORRECTION

Patent No. 3,806,887 Dated April 23, 1974

Inventor(s) DONALD L. SCHULTE, et al

It is certified that error appears in the above-identified patent and that said Letters Patent are hereby corrected as shown below:

Title page, [73] "FTE" should be -- GTE --

Signed and sealed this 10th day of September 1974.

(SEAL)
Attest:

McCOY M. GIBSON, JR.
Attesting Officer

C. MARSHALL DANN
Commissioner of Patents